US 12,062,283 B2

(12) United States Patent
Kiley et al.

(10) Patent No.: US 12,062,283 B2
(45) Date of Patent: *Aug. 13, 2024

(54) MODEL ADAPTATION FOR AUTONOMOUS TRUCKING IN RIGHT OF WAY

(71) Applicant: Cavnue Technology, LLC, Arlington, VA (US)

(72) Inventors: David Kiley, Washington, DC (US); Mathew O'Sullivan, Evanston, IL (US)

(73) Assignee: Cavnue Technology, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,221

(22) Filed: Oct. 26, 2022

(65) Prior Publication Data

US 2023/0115924 A1 Apr. 13, 2023

Related U.S. Application Data

(63) Continuation of application No. 17/872,416, filed on Jul. 25, 2022, now Pat. No. 11,594,133.

(Continued)

(51) Int. Cl.
*G08G 1/0967* (2006.01)
*B60W 60/00* (2020.01)
(Continued)

(52) U.S. Cl.
CPC ....... *G08G 1/096725* (2013.01); *G08G 1/017* (2013.01); *G08G 1/052* (2013.01);
(Continued)

(58) Field of Classification Search
CPC .. G08G 1/096725; G08G 1/017; G08G 1/052; G08G 1/096783; G08G 1/164;
(Continued)

(56) References Cited

U.S. PATENT DOCUMENTS 6,263,799 B1 7/2001 Pardes
7,302,319 B2 11/2007 Wu
(Continued)

FOREIGN PATENT DOCUMENTS

DE 102019212622 A1 * 2/2021 .......... G08G 1/0116
DE 102019212622 A1 2/2021

OTHER PUBLICATIONS

Translation of DE-102019212622-A1, 7 pages (Year: 2021).*
(Continued)

*Primary Examiner* — Dale W Hilgendorf
(74) *Attorney, Agent, or Firm* — Fish & Richardson P.C.

(57) ABSTRACT

Methods, systems, and apparatus, including computer programs encoded on computer storage media, for monitoring a dedicated roadway the runs in parallel to a railroad. In some implementations, a system includes a central server, an interface, and sensors. The interface receives data from a railroad system that manages the railroad parallel to the dedicated roadway. The sensors are positioned in a fixed location relative to the dedicated roadway. Each sensor can detect vehicles in a first field of view on the dedicated roadway. For each detected vehicle, each sensor can generate sensor data based on the detected vehicle in the dedicated roadway and the data received at the interface. Each sensor can generate observational data and instruct the detected vehicle to switch to an enhanced processing mode. Each sensor can determine an action for the detected vehicle to take based on the generated observational data.

20 Claims, 5 Drawing Sheets

Related U.S. Application Data

(60) Provisional application No. 63/225,067, filed on Jul. 23, 2021.

(51) Int. Cl.
*G06N 20/00* (2019.01)
*G08G 1/017* (2006.01)
*G08G 1/052* (2006.01)
*G08G 1/16* (2006.01)

(52) U.S. Cl.
CPC ....... *G08G 1/096783* (2013.01); *G08G 1/164* (2013.01); *B60W 60/0011* (2020.02); *B60W 2300/12* (2013.01); *B60W 2552/05* (2020.02); *G06N 20/00* (2019.01)

(58) Field of Classification Search
CPC ........... B60W 60/011; B60W 2300/12; B60W 2552/05; G06N 20/00
See application file for complete search history.

(56) References Cited

U.S. PATENT DOCUMENTS

| | | | |
|---|---|---|---|
| 7,832,691 B2 | 11/2010 | Reibeling et al. | |
| 8,838,301 B2 | 9/2014 | Makkinejad | |
| 9,248,834 B1 * | 2/2016 | Ferguson | G05D 1/0214 |
| 9,415,783 B2 | 8/2016 | Kissel, Jr. | |
| 9,802,630 B2 * | 10/2017 | Bartolotti | B61L 29/32 |
| 11,138,873 B1 * | 10/2021 | Clifford | G08G 1/04 |
| 11,594,133 B2 * | 2/2023 | Kiley | G08G 1/096783 |
| 11,623,675 B1 * | 4/2023 | O'Sullivan | G08G 1/056 701/117 |
| 11,941,980 B1 * | 3/2024 | O'Sullivan | G08G 1/0141 |
| 2013/0194423 A1 * | 8/2013 | Baines | G08G 1/015 348/148 |
| 2013/0200223 A1 | 8/2013 | Alexander et al. | |
| 2013/0289805 A1 | 10/2013 | Makkinejad | |
| 2016/0189552 A1 * | 6/2016 | Hilleary | G08G 7/02 246/125 |
| 2016/0231746 A1 * | 8/2016 | Hazelton | G05D 1/0257 |
| 2018/0018888 A1 | 1/2018 | Townsend | |
| 2018/0208223 A1 | 7/2018 | Israelsson et al. | |
| 2018/0335781 A1 * | 11/2018 | Chase | G08G 1/0116 |
| 2019/0132709 A1 * | 5/2019 | Graefe | G05D 1/028 |
| 2020/0191602 A1 * | 6/2020 | Zhang | G08G 1/09623 |
| 2023/0024393 A1 * | 1/2023 | Kiley | G08G 1/096725 |

OTHER PUBLICATIONS

Cavnue LLC, "Autonomous Trucking on Rail Rights of Way," Jul. 2021, 10 pages.

dot.alaska.gov [online], "Enjoy the unique experience of a trip to Whittier, Alaska, driving the longest combined vehicle-railroad tunnel in North America!" Sep. 28, 2013, retrieved on Aug. 9, 2022, retrieved from URL<https://dot.alaska.gov/creg/whittiertunnel/>, 2 pages.

International Search Report and Written Opinion in International Appln. No. PCT/US2022/038156, dated Nov. 8, 2022, 16 pages.

Schulz et al., "Levelling crane workload in multi-yard rail-road container terminals, " European Journal of Operational Research, Jan. 5, 2021, 293(3):941-954.

International Preliminary Report on Patentability in International Appln. No. PCT/US2022/038156, mailed on Feb. 1, 2024, 9 pages.

* cited by examiner

MODEL ADAPTATION FOR AUTONOMOUS TRUCKING IN RIGHT OF WAY

CROSS-REFERENCE TO RELATED APPLICATION

This application is a continuation of U.S. patent application Ser. No. 17/872,416, filed Jul. 25, 2022, now U.S. Pat. No. 11,594,133, which claims the benefit of U.S. Provisional Application No. 63/225,067, filed on Jul. 23, 2021, the contents of which are incorporated herein by reference.

TECHNICAL FIELD

This specification generally relates to road surveillance, and one particular implementation relates to monitoring a dedicated roadway the runs in parallel to a railroad.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application is related to a system that monitors a dedicated roadway for autonomous vehicles, running along railroad rights of way, e.g., whether parallel to or in the place of conventional railroad operations. Specifically, the system facilitates access to, monitoring of, and safe navigation of the roadway, for autonomous vehicles, such as autonomous trucks. The system can charge a toll or other fee to autonomous trucks moving along the dedicated roadway from a first point to a second point. The charged tolls can be used to generate revenue for the railroad operator, e.g., potentially at a higher operating margin than what the railroad is typically able to charge for railway operation—without materially adversely impacting the existing rail business. In this manner, introducing tolled autonomous freight infrastructure can be accretive to the value of the railroad right of way.

For example, a railroad right of way may include the Lehigh Railway located in Pennsylvania, which is a short-line railroad that covers 56 track miles. The Lehigh Railway connects between the Reading Blue Mountain and the Northern Railroad along the Susquehanna River. In some cases, the Lehigh Railway can run anywhere between ten to thirty trains per day. However, this utilization can fluctuate. A parallel roadway that enables toll charging of autonomous trucks carrying goods that may not otherwise travel on the Lehigh Railway unlocks an ancillary source of revenue, offsetting days when the railroad is underutilized.

The system described in this application can support the safe movement of autonomous trucks on rail rights of way and charge a toll for autonomous trucks to operate on the parallel-dedicated roadway. By charging a toll for autonomous trucks to move goods from point A to point B alongside the railroad, the railroad operator can unlock incremental value at potentially accretive margins versus when operating as a railroad alone. At the same time, within the autonomous trucking market, there are significant risks to deploying autonomous trucks on active roadways due to safety issues, complexity risks, and operational challenges, to name a few examples. As such, by having a dedicated lane that connects a key freight corridor and runs in parallel to a railroad right of way, a significant advantage exists for autonomous freight operators for deploying trucks within a controlled operating environment that improves reliability, safety, and an ability for autonomous trucks to move goods commercially and at scale. As a result, by providing a parallel-dedicated lane for autonomous trucking, the system can convert legacy underutilized railroad right of way assets into advanced freight corridors that deliver right of way monetization and increase value for railroad operators while at the same time, delivering improved and accelerated deployment of autonomy for trucking fleets.

In some implementations, the system can incorporate sensors placed in a longitudinal manner along the parallel roadway for monitoring the vehicles, their position, their movement amongst other vehicles, and for charging a toll on the vehicles for using the parallel roadway. These sensors can communicate with one another, communicate with one or more trains on the railroads, communicate with the autonomous trucks, and communicate with a central server, to name a few examples. Each sensor has their own field of view for monitoring a designated area of the parallel roadway and can be spaced at a predetermined distance apart from one another alongside the parallel roadway. The sensors themselves can include a LIDAR system, high definition (HD) video cameras, weather monitoring devices, a radar, a BLUETOOTH® system, and a Wi-Fi system, to name a few examples.

The sensors can, for example, generate observations regarding road actors, e.g., vehicles, objects, or people, traversing on the parallel roadway. The sensors can calculate other characteristics about vehicular traffic, e.g., vehicle density per unit area or vehicle congestion, vehicle headway, and vehicle dynamics, each relating to vehicles on the parallel roadway. For example, the sensors can identify an object as the object enters its field of view. Based on the identification of the object, the sensors can further describe a location of the vehicles along the configured roadway, a speed of the vehicle, a relationship of the vehicle to another vehicle, e.g., vehicle headway describing distance and time between two moving vehicles, and others, to name a few examples.

In some implementations, an autonomous vehicle can include an autonomous truck that utilizes vehicular automation. Specifically, the autonomous truck is capable of sensing its environment using a variety of sensors. These sensors can include, for example, cameras, RADAR, LIDAR, sonar, inertial measurement units, and other advanced control systems.

In order to make decisions about traversing roadways autonomously, autonomous trucks can include one or more machine-learning models that produce outputs based on input data provided from its own sensors. These machine-learning models can be trained to produce likelihood of object detections, human detections, proximity of objects, detections of red lights, detections of green lights, clear roadways, congestion, and other examples. In response, the processing components onboard the autonomous trucks can analyze the outputs of the trained machine-learning models and can determine one or more actions for the autonomous truck to take, e.g., turn left, turn right, accelerate, decelerate, stop, etc.

However, the sensors onboard the autonomous trucks may not accurately capture events ongoing within the range of the parallel roadway. For examples, the onboard sensors may not be able to identify that a train has fallen on the parallel roadway a few miles ahead of the autonomous truck's current position. In some examples, the onboard sensors may not be able to view events ahead or behind its current position based on vehicles on the parallel roadway blocking its field of view. This can be an issue when these events may cause the autonomous trucks to change its movement pattern, e.g., adjust speed, change course, or avoid obstacles, to name a few examples. The on-board capabilities of the autonomous vehicles can be impacted by outside factors and may not function reliably 100% of the time. The system described in this application seeks to alleviate these constraints by delivering supplemental complementing to the onboard capabilities of the autonomous trucks during its traversal of the dedicated lanes of the parallel roadway, thereby improving reliability and mitigating the operational burden of remotely monitoring and intervening in autonomous truck operations.

Specifically, the autonomous truck can enhance its thinking, so to speak, when entering the parallel roadway and augment the trained machine-learning model processing with sensor data from not only its own internal sensors but with sensor data from the external sensors. Said another way, the autonomous truck can gain a clearer understanding of its operating environment by utilizing an enriched set of sensor data from both onboard sensors and the external sensors placed longitudinally on the parallel roadway while driving on the parallel roadway. The information from the sensors can define the operating environment, e.g., an environment encompassing the parallel roadway and the parallel railroad, and be supportive of the decision making for the autonomous trucks.

The sensors monitoring the parallel roadway can provide sensor data to the autonomous trucks as they traverse the parallel roadway. The autonomous trucks can provide the received sensor data and/or the supplemental sensor data to their trained machine-learning to produce an enhanced output that improves the decisions making for the autonomous truck. The enhanced output can indicate a likely action for the autonomous truck to take while traversing the parallel roadway. In some implementations, the sensors monitoring the parallel roadway can process sensor data and provide an action for the autonomous truck to take. In this case, the autonomous trucks can effectively enhance its trained machine-learning model with enriched sensor data while traversing the parallel roadway. Consequentially, the trained machine-learning model can improve its decision making capability and determine safer, more informed, and better guided actions for the autonomous truck to take to traverse the parallel roadway—actions that would otherwise be difficult to produce without the sensor data from the external sensors.

In one general aspect, a method is performed by one or more processors. The method includes: receiving, at an interface, data from a railroad system that manages a railroad running parallel to a dedicated roadway; detecting, by each sensor in a plurality of sensors positioned in a fixed location relative to the dedicated roadway, one or more autonomous vehicles in a first field of view on the dedicated roadway, and for each detected autonomous vehicle: generates sensor data for the detected autonomous vehicle based on the detected autonomous vehicle on the dedicated roadway and the data received at the interface from the railroad system; generates observational data based on the generated sensor data; instructs the detected autonomous vehicle to switch to an enhanced processing mode; determines an action for the detected autonomous vehicle based on the generated observational data, the action indicative of an action the autonomous vehicle should take when traversing the dedicated roadway; and instructs the detected autonomous vehicle to traverse the dedicated roadway based on the determined action.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes: displaying, at the interface, data related to the railroad that traverses in parallel to the dedicated roadway and one or more trains traverse the railroad, the data comprising a number of the one or more trains, a direction of the one or more trains traveling on the railroad, and a number of railroads.

In some implementations, the method includes, wherein the autonomous vehicles that traverse the dedicated roadway comprise autonomous trucks.

In some implementations, the method includes: acquiring, by the plurality of sensors, first sensor data of the autonomous vehicles traversing the dedicated roadway; detecting, by the plurality of sensors, an identity for each of the autonomous vehicles from the first sensor data; from the identity for each of the autonomous vehicles, determining, by the plurality of sensors, that each of the autonomous vehicles have entered the dedicated roadway; and in response, transmitting, by the plurality of sensors, an indication to each of the autonomous vehicles to switch to the enhanced processing mode.

In some implementations, the method includes wherein the enhanced processing mode comprises (i) a setting for operating an autonomous vehicle using sensor data from the plurality of sensors and the sensor data onboard the autonomous vehicle or (ii) a setting in which an autonomous vehicle utilizes an enhanced trained machine-learning model for producing actions for traversing the dedicated roadway.

In some implementations, the method includes: acquiring, by the plurality of sensors, second sensor data of the autonomous vehicles traversing the dedicated roadway; acquiring, by the plurality of sensors, third sensor data of one or more trains traversing the railroad that traverses in parallel to the dedicated roadway; transmitting, the plurality of sensors, the acquired second and third sensor data to a central server; receiving, by the central server, the second and third sensor data from each sensor of the plurality of sensors: determining, by the central server, from the received second and third sensor data: prevailing speeds of the autonomous vehicles traversing the dedicated roadway; vehicle dynamics of the autonomous vehicles traversing the dedicated roadway; objects currently identified on the dedicated roadway; and characteristics of the one or more trains traversing the railroad; and in response, determining, by the central server, one or more actions for each of the autonomous vehicles for traversing the dedicated roadway based on the prevailing speeds, the vehicle dynamics, the objects currently identified, and the characteristics of the one or more trains traversing the railroad.

In some implementations, the method includes: acquiring, by the plurality of sensors, fourth sensor data of the autonomous vehicles traversing the dedicated roadway; acquiring, by the plurality of sensors, fifth sensor data indicative of a train that has derailed off the railroad, the railroad traversing in parallel to the dedicated roadway; transmitting, by the plurality of sensors, the acquired fourth and fifth sensor data to a central server; receiving, by the central server, the acquired second and third sensor data from each sensor of the plurality of sensors: determining, by the central server, from the received fourth and fifth sensor data: a first indication that the train has derailed off the railroad; a second indication that at least some of the autonomous vehicles traversing the dedicated roadway are on a path to collide with the derailed train; and in response, transmitting, by the central server, an instruction to the at least some of the autonomous vehicles to (i) reroute traffic on the dedicated roadway to avoid the derailed train, (ii) decelerate the autonomous vehicles, (iii) stop the autonomous vehicles from colliding with the derailed train, or (iv) a combination of (i)-(iii).

In some implementations, the method includes: acquiring, by the plurality of sensors, sixth sensor data of the autonomous vehicles traversing the dedicated roadway of the roadway; detecting, by the plurality of sensors, an identity for each of the autonomous vehicles from the sixth sensor data; determining, by the plurality of sensors, a location for at least some of the autonomous vehicles on the dedicated roadway; from the identity for each of the autonomous vehicles, determining, by the plurality of sensors, that the at least some of the autonomous vehicles are proximate to the end of the dedicated roadway; and in response, transmitting, by the plurality of sensors, an indication to the at least some of the autonomous vehicles to switch to the normal processing mode.

In some implementations, the method includes wherein the normal processing mode comprises a setting for operating an autonomous vehicle with an onboard trained machine-learning model used (i) prior to entrance of the autonomous vehicle to the dedicated roadway and (ii) after the autonomous vehicle exits the dedicated roadway.

The subject matter described in this specification can be implemented in various embodiments and may result in one or more of the following advantages. Specifically, by augmenting the capabilities of the trained machine-learning model while the autonomous truck traverses the parallel roadway, the system described below can improve reliability and mitigate the need for remote intervention for autonomous trucks. Similarly, the system can improve the safety of autonomous trucks operating the roadway. Within a railroad right of way environment, the system can, specifically, (i) can inform vehicles about various actors along the parallel roadway and (i) can inform vehicles about various trains traveling in parallel on the railroad or over a shared roadway in the parallel roadway.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
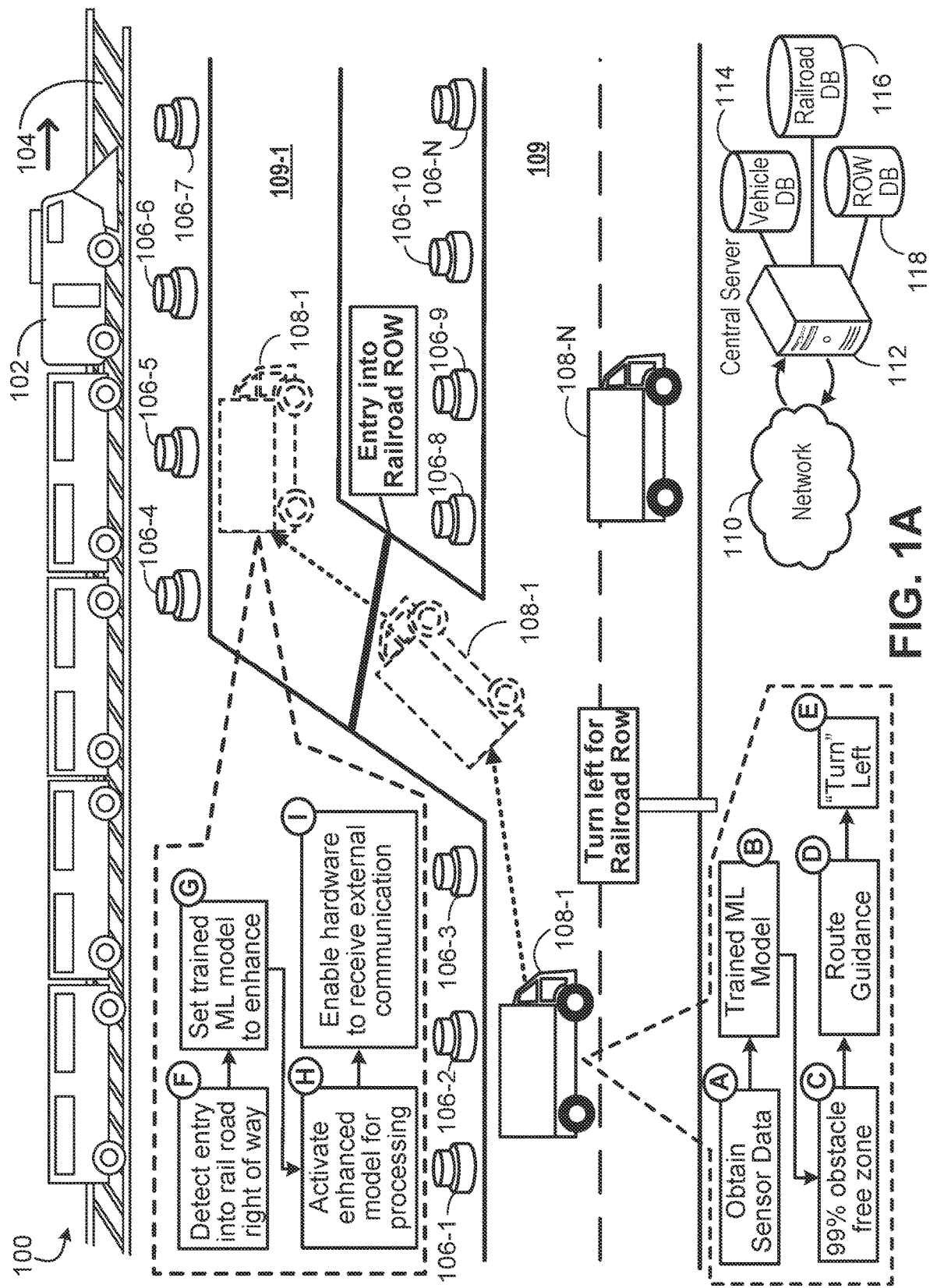
FIG. 1A is a block diagram that illustrates an example of a system for monitoring autonomous vehicles traversing a dedicated roadway that runs along railroad rights of way.

FIG. 1A is a block diagram that illustrates an example of a system 100 for monitoring autonomous vehicles traversing a dedicated roadway that runs along railroad rights of way. The system 100, deployed upon a roadway 109 on which autonomous vehicles 108-1 through vehicle 108-N (collectively "vehicles 108") travel, includes a plurality of sensors 106-1 through 106-N (collectively "sensors 106"), a network 110, a central server 112, a vehicle database 114, a railroad database 116, a railroad rights of way database 118, a train 102, and a railroad 104. In this example, the system 100 illustrates the processes performed by the sensors 106 and the central server 112. The system 100 illustrates two vehicles and eleven sensors, but there may be more or less sensors and more or less vehicles, in other configurations. The roadway 109 is shown in system 100 with multiple lanes in a single direction. The roadway 109 may alternatively or additionally include more or less lanes having autonomous vehicles 108 travel in the same direction as well as more than one lane of vehicles traveling in opposing directions. FIG. 1A illustrates various operations in stages (A) through (I), which can be performed in the sequence indicated, in another sequence, with additional stages, or fewer stages.

In general, the system 100 can provide techniques for monitoring autonomous vehicles 108 on the roadway 109 and instructing autonomous vehicles 108 to take actions when the autonomous vehicles 108 enter a dedicated road 109-1. The roadway 109 can include a dedicated road 109-1. In some implementations, the dedicated road 109-1 can include one or more lanes that run in parallel to a railroad 104. In some implementations, the dedicated road 109-1 can include one or more lanes that run in place of or over top of railroad 104. The dedicated road 109-1 can be separate from the roadway 109 and can be accessed by egressing from the roadway 109.

In some implementations, the system 100 can be used in a drayage environment. In a drayage environment, goods can be transported by trains and/or autonomous trucks over short distances. For example, the goods can be transmitted from a ship that has entered at seaport to a warehouse, or from an inland port to a warehouse. The system 100 can utilize drayage in transferring shipments using various forms of transportation.

The system 100 enables monitoring autonomous vehicles 108 traversing the roadway 109 and the dedicated road 109-1. In some examples, the vehicles 108 can include autonomous vehicles or vehicles controlled by humans. The autonomous vehicles 108 can include and utilize one or more trained machine-learning models and an onboard sensor processing system. Functionally, the one or more trained machine-learning models can execute in conjunction with the onboard sensor processing system to provide navigation and driving capabilities for the autonomous vehicles 108.

These autonomous vehicles 108 can obtain sensor data from its one or more sensors that communicate with an onboard sensor processing system and use the obtained sensor data to navigate the roadway 109. For example, autonomous vehicle 108-1 can analyze the obtained sensor data by providing the obtained sensor data as input to the one or more trained machine-learning models. The one or more trained machine-learning models can output a likelihood detection of an event, a classification of one or more objects illustrated in the sensor data, and other likelihoods of detected events. In response, the autonomous vehicles 108-1's route guidance system can analyze the output from the one or more trained machine-learning models to decide actions for the autonomous vehicle 108-1. These actions can include, for example, turn left, turn right, accelerate, decelerate, stop, or reverse, to name a few examples.

However, the on-board capabilities of the autonomous vehicles 108 can be impacted by external factors and may not function reliably. To improve the capabilities of the autonomous vehicles 108, the system 100 can deliver supplemental processing to the onboard capabilities of the autonomous vehicles 108 during their traversal of the dedicated road 109-1. More specifically, when the autonomous vehicles 108 traverse the dedicated road 109-1 of the roadway 109, the system 100 can provide the supplemental processing to the autonomous vehicles 108 to improve reliability and mitigating the operational burden of remotely monitoring and intervening in autonomous vehicle operations.

As will be further described in detail below, when autonomous vehicles enter the dedicated road 109-1, the autonomous vehicles can receive instructions from sensors proximate to the dedicated road 109-1 to enhance its thinking. In this manner, the autonomous vehicles can switch to using an enhanced machine-learning model. The enhanced machine-learning model can rely on not only sensor data generated by sensors onboard the autonomous vehicle but can also rely on sensor data or instructions provided by the sensors proximate to the dedicated road 109-1. The sensors monitoring the dedicated road 109-1 can offer insight describing events and detection of actors that may be unseen by the onboard sensors of the autonomous vehicles. As such, the enhanced machine-learning model of the autonomous truck can have more visibility of the dedicated road 109-1 using sensor data from both onboard sensors and external sensors that monitor the dedicated road 109-1.

For example, the enhanced machine-learning model can receive inputs from the sensors that monitor the dedicated road 109-1. These inputs can include data indicating detected events on the dedicated road 109-1, actions for the autonomous vehicle to take while traversing the dedicated road 109-1 based on the detected events, and other sensor data as seen by the sensors monitoring the dedicated road 109-1. The enhanced machine-learning model can also receive sensor data as input from its own sensors onboard the autonomous vehicle and vehicle characteristics of the autonomous vehicle. In this case, the autonomous vehicles can effectively use both sets of sensor data for enriching the one or more trained machine-learning models while traversing the dedicated road 109-1 and utilize the actions produced by the enhanced machine-learning model to determine how to traverse the dedicated road 109-1.

The sensors 106 can include a variety of software and hardware devices that monitor objects on the roadway 109 and dedicated road 109-1. For example, the sensors 106 can include a LIDAR system, a video camera, a radar system, a BLUETOOTH® system, weather components, and a Wi-Fi system, to name a few examples. In some implementations, a sensor can include a combination of varying sensor types. For example, sensor 106-1 can include a video camera and a radar system; sensor 106-N can include a video camera and a LIDAR system; and, sensor 106-3 can include a video camera, a LIDAR system, and a Wi-Fi system. Other sensor combinations are also possible.

A sensor can detect and track objects on the roadway 109 through its field of view. Each sensor can have a field of view set by the designer of system 100. For example, if sensor 106-7 includes a video camera, the field of view of the video camera can be based on the type of lens used, e.g., wide angle, normal view, and telephoto, for example, and the depth of the camera field, e.g., 20 meters, 30 meters, and 60 meters, for example. Other parameters for each sensor in system 100 can also be designated. For example, if the sensor 106-1 includes a LIDAR system, then the parameters required for its use would include a point density, e.g., a distribution of the point cloud, a field of view, e.g., angle in the LIDAR system can view over, and line overlap, e.g., a measure to be applied that affects ground coverage. Other parameters for each of the sensors are also possible.

The field of view of each sensor also becomes important because the system 100 can be designed in a variety of ways to enhance monitoring of objects on the roadway 109. For example, a designer may seek to overlap fields of view of adjacent sensors 106 to ensure continuity for viewing the roadway 109 in its entirety. Overlapping field of view regions may facilitate monitoring areas where objects enter the roadway 109 through vehicle on-ramps, exit the roadway 109 through vehicle off-ramps, or merge onto different lanes. In some examples, the designer may decide not to overlap the fields of view of adjacent sensors 106 but rather, juxtapose the fields of view of adjacent sensors 106 to ensure the widest coverage of the roadway 109. In this manner, the system 100 can monitor and track more vehicles on roadway 109 at a time.

In addition, each sensor can include memory and processing components for monitoring the objects on the roadway 109. For example, each sensor can include memory for storing data that identified and tracks the objects in the order the vehicles appear to a sensor. Similarly, each of the sensors 106 can include processing components for processing sensor data, identifying the objects in the sensor data, generating the data that identifies, and is later used to track the identified objects. The processing components can include, for example, video processing components, sensor-processing components, transmission components, and receive components and/or capabilities. Each of the sensors 106 can also communicate with one another over the network 110. The network 110 may include a Wi-Fi network, a cellular network, a BLUETOOTH® network, an Ethernet network, or some other communicative medium.

The sensors 106 can also communicate with a central server 112 over network 110. The central server 112 can include one or more servers connected locally or over a network. The central server 112 can also connect to one or more databases, e.g., a vehicle database 114, a railroad database 116, and right of way database 118. For example, the central server 112 can store data that represents the sensors 16 that are available to be used for monitoring the roadway 109. The data indicates which sensors 106 are active, which sensors 106 are inactive, the type of data recorded by each sensors, and data representing the fields of view of each sensors.

The central server 112 can store data identifying each of the sensors 106 such as, for example, IP addresses, MAC addresses, and preferred forms of communication to each particular sensor. The data can also indicate the relative positions of the sensors 106 in relation to each other. In this manner, a designer can access the data stored in the central server 112 to learn which sensors 106 are being used to monitor the roadway 109, pertinent information for each of these sensors 106, and debugging information related to each of these sensors 106.

During stage (A), the sensors 106 deployed along roadway 109 can generate sensor data that represents autonomous vehicles 108 traversing the roadway 109. The sensors 106 can be deployed longitudinally along roadway 109, along both sides of the roadway 109, spaced a predetermined distance apart from one another, and positioned so that its field of view faces the roadway 109. Moreover, the sensors 106 can be configured to generate sensor data of road actors, e.g., objects in the roadway 109, autonomous vehicles 108 in the roadway 109, people walking in parallel to and perpendicular to roadway 109, and other objects.

The roadway 109 can include various types of roads. For example, the types of roads can include exit ramps, entry ramps, general-purpose lanes, high occupancy vehicle (HOV) lanes, highways, back roads, side streets, and other roads. The other roads can include different types of various capacity roads, larger roads, private roads, intersecting roads, and other thoroughfares that sensors 106 displaced along these roads can generator sensor data. The sensors 106 positioned along these roads can generate sensor data as they detect road actors entering their field of view on the roadway 109. For example, the sensor data generated by each of the sensors 106 can include an identification of a vehicle type, identification of an object type, characteristics of detected vehicles, vehicular congestion, vehicle dynamics, and vehicle density per unit area, to name some examples.

The identification of the vehicle type can correspond to, for example, a truck, a sedan, a minivan, a hatchback, an SUV, and other vehicle types. The identification of the vehicle type can be based on a size of the vehicle, for example. Characteristics of the vehicle can include, for example, vehicle color, vehicle size, wheelbase distance, length of vehicle, height of vehicle, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

In some implementations, the sensors 106 deployed at each of these roadways can generate the sensor data at various intervals. For example, each time a sensor detects a vehicle in its field of view, the sensor can generate the sensor data. In response to generating the sensor data, sensors 106-1 can transmit the generated sensor data to the next sensor in the longitudinal direction along the same roadway 109 to confirm that it also detects similar sensor data. The next sensor can pass its generated sensor data to the next sensor down the longitudinal line on the roadway 109 to ensure it sees similar vehicles. In this manner, the generated sensor data is highly accurate because each sensor on the roadway 109 can confirm the prior sensor's generated sensor data. In some examples, the sensors 106 can generate sensor data on a time basis, such as every 2 seconds. On the time basis, the sensors 106 may reduce their bandwidth and processing, but ultimately include less accurate sensor data results.

For example, sensor 106-1 can detect that an autonomous vehicle 108-1 has entered its field of view. In response to detecting, the sensor 106-1 can record sensor data or media of a segment or portion of the roadway 109 and process the recorded sensor data using object detection or some other form of classification to detect the moving object. The object detection can seek to identify a vehicle, a person, an animal, or an object on the roadway 109. The object may be stationary or moving. In the example of system 100, the sensor 106-1 can detect and classify autonomous vehicle 108-1 on the main portion of roadway 109. Similarly, the sensors 106-1, 106-2, 106-3, and 106-8 will have processed vehicle 108-N.

In some implementations, each of the sensors 106 can detect autonomous vehicle 108-1 by performing data aggregations of observations over a window of time. The data aggregations can improve the sensors' detectability of a vehicle in its field of view. The data aggregation can ensure that each sensor can identify and detect similar vehicles and their corresponding features.

The sensor 106-1 can then identify one or more features of the autonomous vehicle 108-1 detected in its field of view. These features can include observable properties of the vehicle, such as the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. For example, the sensor 106-1 can determine that autonomous vehicle 108-1 is a green colored vehicle, is over 110 ft$^3$ in size, has a vehicle type of a sedan, and is a small sized vehicle. The sensor 106-1 may also be able to determine one or more characteristics of the vehicle, such as its rate of speed, the distance away from the sensor 106-1, the autonomous vehicle 108-1's direction of travel, and a number of individuals found in the autonomous vehicle 108-1, to name a few examples.

In some implementations, the types of components found at the particular sensor that detect the vehicle can determine the characteristics that describe the vehicle. For example, sensor 106-1 may include a video camera and a radar system. The sensor 106-1 can then determine characteristics using the media recorded from the video camera and the electromagnetic reflectivity from the radar system. For example, the sensor 106-1 can determine a color of the object, a size of the object, a distance from the object, a rate of movement of the object, and a direction of movement of the object. However, if the sensor 106-1 does not include the radar system, the sensor 106-1 can use other external components to determine the distance from the object, rate of movement of the object, and direction of movement of the object. For example, the sensor 106-1 may be able to utilize an external classifier to produce these results. The external classifier may be stored at the sensor 106-1 or stored at a location accessible to the sensor 106-1 over network 110, e.g., such as the central server 112. Thus, the system 100 can benefit from having a combination of components to improve the detection process found at each of the sensors.

In some implementations, the sensor 106-1 can generate other feature data on the sensor data using sensor fusion. For example, in the case where sensor 106-1 utilizes multiple components, e.g., LIDAR, radar, and a video camera, the sensor 106-1 can combine the observation from each of these components and assign these observations to a point in space. The point in space can correspond to an N-dimensional value that describes the feature. Then, the sensor 106-1 can use features to calculate and classify that particular point in space. For example, the sensor 106-1 can enjoin data from the LIDAR system, the radar system, and the video camera. The LIDAR system can generate 1 point per centimeter for 150-meter range for viewing the roadway 109, for example. The radar system can perform calculations that estimate where the vehicle or object is located in relation to the radar system. The video camera can estimate a volumetric projection of the identified object or vehicle based on a volumetric projection estimation algorithm. The sensor 106-1 can then calculate an identity product, e.g., the feature data, using the observations from each of these sensors, which can correspond to a hash of the observations. For example, the sensor 106-1 can calculate an identity product of the feature data and a timestamp the features were identified, from data provided by each of the sensors.

Then, the sensor 106-1 can transmit data representing the identity product of the feature data to the next sensor in the direction of traffic, e.g., sensor 106-2. The sensor 106-1 may transmit the data representing the identity product of the feature data when autonomous vehicle 108-1 has exited sensor 106-1's field of view. The data representing the identity product of the feature data can include, for example, a data structure, a matrix, or a link to data stored in a database. The sensor 106-1 can determine which sensor is the next sensor in a longitudinal line along the roadway 109. In some implementations, the sensor 106-1 may determine the next sensor by checking an order of the sensors. In some implementations, the sensor 106-1 may request from the central server 112 to indicate which sensor is the next sensor to receive the data. In response to receiving an indication from the central server 112 indicating which sensor to transmit the data, e.g., sensor 106-2, the sensor 106-1 can transmit the data representing the identity product of the feature data to sensor 106-2 over network 110.

The sensor 106-2 can receive the identity product of feature data from the sensor 106-1. The sensor 106-2 can generate feature data when it detects autonomous vehicle 108-1 in its field of view. In response to generating the feature data, the sensor 106-2 can compare the generated feature data with the received feature data from sensor 106-1. If the comparison results in a match or a near match within a threshold value, then the sensor 106-2 can determine that it is viewing the same autonomous vehicle 108-1 as seen by sensor 106-1. In some examples, sensor 106-2 may transmit a confirmation back to sensor 106-1 indicating that it saw the same vehicle. Then, when autonomous vehicle 108-1 exits the field of view of sensor 106-2, the sensor 106-2 can transmit the generated feature data to the next sensor down the roadway 109, e.g., sensor 106-3. Each sensor within system 100, e.g., sensors 106-1 through 106-N, can perform a similar process when a vehicle is detected in its field of view.

In some implementations, the sensors can transmit their respective sensor data to the central server 112 each time a new object is detected. In some examples, the sensors can transmit their respective sensor data when a sensor receives confirmation from the next sensor down the longitudinal line of sensors. The generated sensor data can not only include data regarding detected objects, but data identifying the sensors. The data identifying the sensors can include, for example, a type of sensor, the data generated by the sensor, IP addresses of the sensor, and MAC addresses of the sensor.

The central server 112 can receive the sensor data from each of the sensors. In some examples, the central server can access one or more databases to retrieve the generated sensor data from each of the sensors. In response, the central server 112 can generate vehicular characteristics from the generated sensor data. The vehicular characteristics can include, for example, prevailing speeds of the vehicles, vehicle dynamics, sensor visibility, object identification, and train characteristics.

For example, the prevailing speeds of the vehicles along the roadway 109 can correspond to the speed at which 85 percent of the vehicles are traveling at or below that speed. The central server 112 can use the calculated prevailing speed as a reference for the speeds at which the autonomous vehicles 108 should travel along the dedicated road 109-1. The central server 112 can determine vehicle dynamics of autonomous vehicles 108 currently traversing the roadway 109. The vehicle dynamics can include vehicle acceleration, vehicle speed, and vehicle deceleration. Moreover, the central server 112 can determine sensor visibility, and determine whether the sensors can accurately see the road actors on the dedicated road 109-1. The central server 112 can determine from the sensor visibility whether a sensor is too close to another sensor, as the sensors share overlapping fields of view, and whether the sensors are too close or too far from the roadway 109. In response to generating this information, the central server 112 can aid the sensors monitoring the roadway 109 in determining actions for the vehicles to take. For example, based on current detected speeds of vehicles and identification of trains in the sensors data, the central server 112 can instruct the sensors to instruct the autonomous vehicles traversing the dedicated road 109-1 to take a specific action, e.g., slow down, accelerate, or stop, to name a few examples.

Similarly, the autonomous vehicle 108-1 may include one or more sensors, an onboard processing sensor system, and one or more trained machine-learning models. As autonomous vehicle 108-1 traverses the roadway 109, the sensors of autonomous vehicle 108-1 can obtain sensor data in a continuous fashion. The sensor data can include, for example, video, audio, LIDAR data, radar data, and other data types. The sensor data can illustrate an environment proximate to the autonomous vehicle 108-1 as seen by its sensors. The environment can include, for example, a portion of the roadway 109, traffic signs, traffic lights, merge lanes, transition lanes, exit lanes, continuous lanes, objects in the roadway 109, the railroad 104, train 102, and other data. The sensors of autonomous vehicle 108-1 (and the other autonomous vehicles) can obtain sensor data in a continuous or periodic fashion, to name a few examples.

In some implementations, the onboard sensor system can obtain current vehicle characteristics. Specifically, the onboard sensor system can communicate with various devices in the autonomous vehicle 108-1's using the controller area network (CANBUS) system. The CANBUS system can provide a means for the onboard sensor system to obtain information related to the autonomous vehicle 108-1's characteristics. These characteristics can include, for example, data related to autonomous driving, advance driver assistance system (ADAS), transmission, airbags, antilock braking (ABS), cruise control, electric power steering, audio systems, power windows, doors, mirror adjustment, battery and recharging systems, and vehicle dynamics, e.g., vehicle speed. For example, the onboard sensor system can communicate with the engine control unit (ECU) using the CANBUS system to obtain vehicle characteristic information.

During stage (B), the onboard sensor system can provide the sensor data and the vehicle characteristics as input to the one or more trained machine-learning models. For example, the one or more trained machine-learning models can receive as input video, audio, images, LIDAR data, radar information, current vehicle characteristics information, and other data types. These data types can be in the form of image files, binary files, and other file types. The one or more trained machine-learning models can process the received inputs through each of the nodes in the models. The one or more trained machine-learning models can receive inputs and generate outputs on a continuous basis or each time the sensors obtain new input data.

During stage (C), the one or more trained machine-learning models can output a likelihood detection of an event, a classification of one or more objects illustrated in the sensor data, and other detected events in response to processing the inputs. For example, as illustrated in system 100, the one or more trained machine-learning models can output a detection of 99% of an obstacle free zone on roadway 109. This output can indicate to the route guidance system of the autonomous vehicle 108-1 that the portion of roadway 109 as seen by onboard sensors does not detect an obstacle, an object, or other blocking device on roadway 109 with 99% confidence.

The one or more trained machine-learning models can also output other detection types and confidence levels. For example, the one or more trained machine-learning models can output a 70% detection of a deer on roadway 109, a 90% detection of a train on roadway 109, e.g., indicative of train 102 that has fallen off the railroad 104 and onto the roadway 109, a 30% detection of rainy or ice on roadway 109, and other detection types. The one or more trained machine-learning models can output a likelihood of an event and a description of an event depicted in the input. In response to generating the output, the onboard sensor processing system can provide the output to a route guidance system of the autonomous vehicle 108-1.

During stage (D), the route guidance system of the autonomous vehicle 108-1 can receive the output from the one or more trained machine-learning models. The route guidance system can include one or more algorithmic processes that can monitor a location of a vehicle in real time, e.g., via geographic coordinate system (GPS), and map the location of the vehicle on a digital map. For an autonomous vehicle, the route guidance system can ensure the autonomous vehicle 108-1 follows a route guidance from an origin location to a destination location.

The route guidance system can identify a path for the autonomous vehicle 108-1 to travel from an origin location to a destination and ensure the autonomous vehicle 108-1 reaches the destination safely. Specifically, the route guidance system can produce actions for the vehicle to take while traversing to the destination. These actions can include, for example, accelerate, change lanes, stop, decelerate, turn left, turn right, U-turn, and other actions. The route guidance system can rely on outputs from the one or more trained machine-learning model to produce actions for the autonomous vehicle to take while traversing to the destination. For example, if the route guidance system determines that the one or more trained machine-learning models determines a 99% likelihood of obstacle free zone, then the route guidance system can determine that the autonomous vehicle 108-1 continues on its guided path to the destination.

Alternatively, if the one or more trained machine-learning models determine a 99% likelihood of an identified obstacle on the roadway 109, and then the route guidance system can determine an action for the autonomous vehicle 108-1 to avoid the obstacle. These actions to avoid the obstacle can include, for example, stopping until the obstacle has cleared, slowing down to let the obstacle pass off the roadway 109, changing lanes to avoid the obstacle, and other actions. The route guidance system can continuously output actions for the autonomous vehicle 108-1 to take based on a monitoring of the route guidance path and the output provided by the one or more trained machine-learning models.

In some implementations, an external party may set a route guidance path for the autonomous vehicle 108-1 to travel. The external party, which may include a human or a computer system, may set the route guidance path for the autonomous vehicle 108-1 to travel before the autonomous vehicle 108-1 departs for the destination. Similarly, the autonomous vehicle 108-1 may receive a route guidance path while in transit to a destination and may receive updates to the route guidance path while in transit to the destination. In some examples, the route guidance path can include, for example, a GPS location of a destination, a path for the route guidance system to follow from an origin to a destination, a name of a destination, and other data specifying the origin location, the destination, and the path for the route guidance system to follow.

During stage (E), the route guidance system of the autonomous vehicle 108-1 can produce an action to take. As illustrated in system 100, for example, the action can include "Turn Left." As depicted by the dotted line in system 100, the autonomous vehicle 108-1 can turn left from the roadway 109 to the dedicated road 109-1. As previously mentioned, the dedicated road 109-1 can include one or more lanes that run in parallel to the railroad 104. In response to producing an action, the route guidance system can instruct the autonomous vehicle 108-1 to move in accordance with the action. For example, if the route guidance system instructs the autonomous vehicle 108-1 to turn left, then the route guidance system can instruct various components of the vehicle, e.g., steering wheel, axel, tires, accelerator, brake, etc., to collectively move the autonomous vehicle 108-1 to make a left turn. Similarly, the route guidance system can instruct the autonomous vehicle 108-1 to take other actions as well.

In some implementations, the route guidance system of the autonomous vehicle 108-1 can receive an instruction from an external party to instruct the autonomous vehicle 108-1 to enter the dedicated road 109-1. In some implementations, the route guidance system of the autonomous vehicle 108-1 can automatically generate an instruction that instructs the autonomous vehicle 108-1 to enter the dedicated road 109-1. These instructions can come from a prior route guidance party or during the autonomous vehicle 108-1's current traversal on roadway 109.

In some implementations, the sensors 106 can monitor the path of traversal of the autonomous vehicle 108-1 on the roadway 109. For example, as the autonomous vehicle 108-1 enters and subsequently exits the fields of view of sensors 106-1, 106-2, and 106-3, these specific sensors can identify the autonomous vehicle 108-1 and detect its movement. However, after sensor 106-3 detects the autonomous vehicle 108-1 entering and exiting its field of view, the sensor 106-3 can transmit its identity product of feature data to both sensors 106-4 and sensor 106-8. The sensors can transmit the identity product of feature data to multiple sensors when the roadway 109 splits in different directions. By transmitting the identity product of feature data to multiple sensors, e.g., sensor 106-4 and sensor 106-8, the sensors 106 can continuously monitor the path of autonomous vehicle 108-1's movement when the roadway 109 travels in different directions.

For example, if the sensor 106-8 determines a vehicle entered its field of view and determines that the identity product of feature data received from sensor 106-3 matches to the feature data generated by sensor 106-8, then sensor 106-8 can determine that autonomous vehicle 108-1 is the same vehicle seen by sensor 106-3-8, and that the autonomous vehicle 108-1 is traversing down roadway 109. Alternatively, if the sensor 106-4 determines a vehicle entered its field of view and determines that the identity product of feature data received from sensor 106-3 matches to the feature data generated by sensor 106-4, then sensor 106-4 can determine that autonomous vehicle 108-1 is the same vehicle seen by sensor 106-3, and that the autonomous vehicle 108-1 has turned into the dedicated road 109-1 from the roadway 109. As illustrated in system 100, autonomous vehicle 108-1 has departed the roadway 109 and entered the dedicated road 109-1.

In response to sensor 106-4 detecting that it has seen the same vehicle in its field of view as a previous, subsequent sensor, e.g., sensor 106-3, then sensor 106-4 can transmit the identity product of feature data to each of the other sensors. In this manner, the other sensors 106 can also seek to determine whether they see one or more similar vehicles in their field of view. This ensures the sensors can track each of the vehicles 108 as they traverse the roadway 109 and the dedicated road 109-1. In some implementations, the sensor 106-4 can transmit a notification to the autonomous vehicle 108-1 upon entering the dedicated road 109-1 to switch to an enhanced machine-learning model in response to detecting the autonomous vehicle 108-1's entry to the dedicated road 109-1.

During stage (F), the autonomous vehicle 108-1 can detect entry into the dedicated road 109-1. In some implementations, the entry into the dedicated road 109-1 can include a toll. The toll can charge a customer or owner of the autonomous vehicle 108-1 upon passing through the toll. The toll can include, for example, a radio frequency ID reader, toll plazas, tollbooths, tollhouses, toll stations, toll bars, toll barriers, or tollgates, to name a few examples. Some tolls can be automatically charged and some tolls may be manually charged. In the case of autonomous vehicles, tolls can charge the autonomous vehicles with electronic toll collection equipment which can automatically communicate with the autonomous vehicle's transponder or use automatic vehicle plate recognition to charge the vehicles by debiting corresponding accounts. The charged toll can be used to generate revenue operator without materially adversely impacting the existing rail business. In some examples, the charged toll may be at a higher operating margin than what the railroad operator typically charges for railroad operation. In some examples, the charged toll may cost a similar amount to what the railroad operator typically charges for railroad operation.

In some implementations, a marker can signal the entry into the dedicated road 109-1. The marker can include, for example, a line on the dedicated road 109-1, a sign indicating "Entry into Railroad ROW," audio indicating entry into the dedicated road 109-1, a speed bump, and other indicators. The sensors onboard the autonomous vehicle 108-1 can detect the marker, and signify to the route guidance system of its entry into the dedicated road 109-1. In some implementations, the onboard sensor system of the autonomous vehicle 108-1 can switch to an enhanced machine-learning model in response to detecting the autonomous vehicle 108-1's entry to the dedicated road 109-1 using the marker. In some implementations, the onboard sensor system of the autonomous vehicle 108-1 can switch to an enhanced machine-learning model in response to receiving a notification from the sensors monitoring the dedicated road 109-1 to switch its processing capabilities to the enhanced mode.

During stage (G), the onboard sensor system of the autonomous vehicle 108-1 can set the one or more trained machine-learning models as enhanced in response to detecting its entry into the dedicated road 109-1. For example, in response to detecting entry into the dedicated road 109-1, the onboard sensor system of the autonomous vehicle 108-1 can perform at least one of the following functions: (i) enabling the one or more trained machine-learning models to receive additional inputs related to the sensor data from sensors monitoring the dedicated road 109-1, (ii) deleting the one or more trained machine-learning models from memory to access different enhanced machine-learning models, (iii) removing the one or more trained machine-learning models from cache memory and storing the one or more trained machine-learning models in main memory, and (iv) transmitting the one or more trained machine-learning models to the central server 112 for later retrieval and removing the one or more trained machine-learning models from memory, to name some examples. Generally, accessing and instantiating the one or more enhanced trained machine-learning models enables the autonomous vehicle 108-1 to be better prepared for events occurring on the dedicated road 109-1. Specifically, by activating the enhanced trained machine-learning models on the autonomous vehicle 108-1, the onboard sensor system, and the route guidance system can determine actions that are safer and more reliable during the autonomous vehicle 108-1's entire traversal of the dedicated road 109-1.

During stage (H), in response to setting the one or more trained machine-learning models as enhanced, the onboard sensor system of the autonomous vehicle 108-1 can activate an enhanced machine-learning model for further processing. In some examples, the onboard sensor system can insert the enhanced machine-learning model in cache memory to enable accessing the enhanced machine-learning model on a more frequent basis. In some examples, the onboard sensor system can request the enhanced machine-learning model from the central server 112. In this example, the onboard sensor system can transmit a request to the central server 112 over network 110 for the enhanced machine-learning model and subsequently receive the enhanced machine-learning model in response from the central server 112.

During stage (I), the onboard sensor system of the autonomous vehicle 108-1 can activate one or more sensors for communication purposes. In some implementations, the onboard sensor system of the autonomous vehicle 108-1 can activate one or more sensors for communication in response to activating the enhanced machine-learning model. The one or more sensors for communication purposes can include, for example, Wi-Fi capabilities, cellular capabilities, BLUETOOTH® capabilities, and other network communication capabilities. The onboard processing system of the autonomous vehicle 108-1 activates the one or more communication sensors while the autonomous vehicle 108-1 traverses the dedicated road 109-1 because the sensors monitoring the dedicated road 109-1 can communicate data to the autonomous vehicle 108-1 for navigation.

Specifically, as the autonomous vehicle 108-1 traverses the dedicated road 109-1, the autonomous vehicle 108-1 can utilize the data provided by these sensors to support the decision making for the autonomous vehicle 108-1. In some implementations, the onboard sensor system can receive sensor data from the sensors monitoring the dedicated road 109-1 and provide the received sensor data to the enhanced machine-learning model to produce an enhanced output. Moreover, the enhanced machine-learning model can also receive sensor data from the sensors onboard the autonomous vehicle 108-1 and data indicative of the vehicle characteristics to augment the decision-making capabilities of the enhanced machine-learning model. The enhanced output can indicate a likelihood of a detected event or a likely action for the autonomous vehicle 108-1 to take while traversing the dedicated road 109-1. In response, the onboard sensor system can provide the enhanced output to the route guidance system for generating one or more actions for the autonomous vehicle 108-1 to take. The various actions and decisions that the autonomous vehicle 108-1 can take while traversing the dedicated road 109-1 will be further described below.

As illustrated in system 100, sensors 106-4 through 106-7, and subsequently sensors 106-11 through 106-17 shown in FIGS. 1B and 1C, respectively, can monitor passage of vehicles through the dedicated road 109-1. In some implementations, one or more sensors can monitor an entryway of the dedicated road 109-1. Specifically, one or more sensors proximate to entry of the dedicated road 109-1 can be configured to monitor the entryway of the dedicated road 109-1. For example, sensors 106-4 and 106-5 can be configured to monitor the areas that include and are proximate to the marker at the entry of the dedicated road 109-1. In this example, sensors 106-4 and 106-5 can have their fields of view cover areas within and proximate to the marker at the entry of the dedicated road 109-1.

In some implementations, when sensor 106-4 (*i*) receives an identity product of feature data from sensor 106-3 and (*ii*) determines the vehicle seen in its field of view matches to the vehicle seen by sensor 106-3, the sensor 106-4 can be configured to take additional actions. In some implementations, when sensor 106-4 or sensor 106-5 detects an object in its field of view at the entry of the dedicated road 109-1, the sensors 106-4 or 106-5 can be configured to take the additional actions. The latter implementation can be performed without sensor 106-3 notifying sensors 106-4 and 106-5 of a detected vehicle. The additional actions can include, for example, transmitting a notification to the detected vehicle to switch to an enhanced processing mode, notifying other sensors monitoring the dedicated road 109-1 of the detection of a vehicle entering the dedicated lane, transmitting a notification to the central server 112 indicating a vehicle has entered the dedicated lane, a combination of the above actions, or a different action.

For example, as illustrated in system 100, sensor 106-4 can detect autonomous vehicle 108-1 approaching the marker at the entryway of the dedicated road 109-1 and subsequently entering the dedicated road 109-1. In response to detecting the autonomous vehicle 108-1 entering the dedicated road 109-1, the sensor 106-4 can transmit a notification to the autonomous vehicle 108-1 to switch to an enhanced processing mode. In some implementations, the autonomous vehicle 108-1 may have switched to the enhanced processing mode prior to receiving the notification from one or more sensors monitoring the dedicated road 109-1 or the entryway of the dedicated road 109-1. In this implementation, the onboard processing system of autonomous vehicle 108-1 can receive the notification from the sensor 106-4, for example, and in response can transmit a notification to the sensor 106-4 confirming the switch to the enhanced processing mode has been performed.

In response, the sensor 106-4 can transmit a confirmation to each of the sensors monitoring the dedicated road 109-1 indicating that the vehicle traversing the dedicated lane has switched to the enhanced processing mode. In this manner, each of the sensors, e.g., sensors 106-4 through 106-7 and 106-11 through 106-17, can ensure that the autonomous vehicle 108-1 is prepared to receive instructions from these sensors. If the sensor 106-4 transmits a notification to the autonomous vehicle 108-1 and does not receive a confirmation back within a predetermined period of time, then the sensor 106-4 can transmit a notification to the central server 112 indicating that the autonomous vehicle that has entered the dedicated road 109-1 is not properly communicating. The central server 112 can receive this notification and notify the authorities that a vehicle traversing the dedicated lane may be an at risk vehicle and should be inspected by the authorities for unsafe driving. In this case, the sensors 106-4 through 106-17 can continue to send instructions to the autonomous vehicle 108-1 to cease driving the dedicated road 109-1 until the autonomous vehicle 108-1 returns a confirmation message indicating a switch to the enhanced processing mode has been performed.

In some implementations, the sensors 106 monitoring the dedicated road 109-1 can also monitor the railroad 104. Specifically, the sensors 106-4 through 106-17 can monitor train activities on railroad 104. These sensors 106-4 through 106-17 may include, for example, omni-directional capability that enables these sensors to obtain sensor data from each direction simultaneously, in a 360-degree fashion. In this manner, the sensors 106-4 through 106-17 can not only monitor autonomous vehicles 108 entering and traversing the dedicated road 109-1 but also one or more trains, e.g., train 102, traversing the railroad 104. Should an autonomous vehicle accidentally cross onto the railroad 104, then the sensors 106 can notify the railroad system of a vehicle on the railroad 104. Alternatively, should the train 102 fall off the railroad 104 onto the dedicated road 109-1, the sensors 106 can notify the one or more autonomous vehicles traversing the dedicated road 109-1 of actions to take to avoid the fallen train 102.

In some implementations, the railroad 104 and the dedicated road 109-1 may overlap with one another. For example, a center of the dedicated road 109-1 may include the railroad 104. In this case, the autonomous vehicles 108 can traverse the combined roadway when the train 102 is not simultaneously traversing the combined roadway, and the train 102 can traverse the combined roadway when the autonomous vehicles 108 are not simultaneously traversing the combined roadway. The sensors 106 monitoring the combined roadway can send a notification to autonomous vehicles 108 seeking to enter the dedicated road 109-1 upon detection to wait before entering the dedicated road 109-1 should a train 102 be traversing the dedicated road 109-1. Once the train 102 has passed through the combined roadway, the sensors 106 can transmit a notification to the autonomous vehicles 108 seeking to enter the dedicated road 109-1 signaling it is safe to enter the dedicated road 109-1. Here, the sensors 106 monitoring the dedicated road 109-1 that includes the railroad 104 can generate sensor data of both detected autonomous vehicles and the train 102 and provide actions for the detected autonomous vehicles to take based on the generated sensor data.

In some implementations, the sensors 106 can determine that the train 102 has priority over autonomous vehicles 108 for traversing the combined roadway. In some examples, the sensors 106 can set the train 102 as having priority over the autonomous vehicles 108 because the train 102 cannot receive communications from the sensors 106. In some examples, the sensors 106 can set the train 102 as having priority over the autonomous vehicles 108 based on instructions provided from the railroad system or the central server 112.

In some implementations, the central server 112 can store one or more data components of system 100. Specifically, the central server 112 can store the one or more trained machine-learning models from each of the vehicles that traverse the roadway 109 and the dedicated road 109-1. The central server 112 can store the enhanced machine-learning model used by each of the autonomous vehicles 108 that traverse the dedicated road 109-1. The central server 112 can receive requests from one or more vehicles for retrieval of the enhanced machine-learning-model, for storing the one or more trained machine-learning models associated with an autonomous vehicle while the autonomous vehicle traverses the dedicated road 109-1, and for retrieving the one or more trained machine-learning models associated with an autonomous vehicle after the autonomous vehicle exits the dedicated road 109-1.

The central server 112 can store each of the abovementioned data components to alleviate the memory constraint required by each of the autonomous vehicles for storing the machine-learning models. In this manner, when the one or more trained machine-learning models are not in use on the autonomous vehicles, they can be stored on the central server 112. When needed, the autonomous vehicles can transmit requests for a specific model or set of models from the central server 112. In some implementations, the central server 112 can store the data related to each of the models in a vehicle database 114.

The vehicle database 114 can store data indicating one or more vehicles that traverse the dedicated road 109-1. Specifically, the vehicle database 114 can store indexing information that identifies a vehicle and associates the index information with data related to the vehicle. For example, the indexing information can include an IP address, a MAC address, or another address related to the device that communicated a message from the onboard sensor system of the autonomous vehicle, e.g., autonomous vehicle 108-1.

The data related to the vehicle can include, for example, the enhanced machine-learning model, one or more trained machine-learning models used by the vehicle, and historic data related to the vehicle. The enhanced machine-learning model may be specific to a particular autonomous vehicle. Similarly, the one or more trained machine-learning models may be specific to a particular autonomous vehicle. As such, the central server 112 can track, store, train, and update the various machine-learning models according to specific vehicle configurations. The historic data can include, for example, a number of times the corresponding vehicle has accessed the dedicated lane, a number of times the corresponding vehicle has been detected by the sensors 106, and a number of times the corresponding vehicle has been reported by the sensors 106 as not having confirmed receipt of performing the switch to the enhanced processing mode, to name a few examples. Other examples are also possible.

In some implementations, the central server 112 can also receive requests from one or more of the sensors for notifying the authorities. One or more of the sensors 106 can detect a vehicle that is driving unsafely on the dedicated road 109-1 or failing to comply with the sensor provided instructions. In response, the one or more of the sensors 106 can transmit a notification to the central server 112 indicating a detected vehicle is driving unsafely on dedicated road 109-1, for example. The central server 112 can receive the notification and notify the proper authorities in response to try and prevent any further accidents or damage on the dedicated road 109-1. In this example, the one or more sensors can provide sensor data illustrating the corresponding vehicle, the identity product of the feature data as determined by the sensor data of the vehicle, and other data that represents the vehicle traversing unsafely on the dedicated road 109-1.

In some implementations, the central server 112 can also communicate with a railroad database 116 and a right of way (ROW) database 118. The railroad database 116 can include data related to the activities of train 102. For example, the activities can include a number of trips taken by the train 102 on railroad 104, actual start times for each trip, actual end times for each trip, planned start times for each trip, planned end times for each trip, future planned trips for the train 102 on railroad 104, profit received for operating the train 102 on railroad 104, contact information for an operator of the train 102, and data identifying a railroad system that manages the train 102 and the railroad 104, to name a few examples.

The data identifying the railroad system can include data identifying an interface that receives data from an external user or external system for managing the train 102 and the railroad 104. A client device, a computing device, or another device can provide the interface. An individual, such as a train manager, can provide data indicative of the train 102 and the railroad 104 to the interface. In some example, the railroad system can be a computer system that can provide data indicative of the train 102, data indicative of the railroad 104, data indicative of past trips taken by trains on the railroad 104, and data indicative of future trips on the railroad 104. Subsequently, the central server 112, one or more other devices in system 100, the sensors 106, and the autonomous vehicles 108 can access data provided through the interface in system 100.

The data indicative of the train 102 and the railroad 104 that can be received by the interface and subsequently transmitted to various devices in system 100 can include, for example, a number of cars connected on train 102, a time for an upcoming trip of train 102, any mechanical issues or failures related to train 102, contact information for a train operator, or dynamic characteristics related to the train 102, e.g., train speed, acceleration, and direction of travel, to name a few examples.

Similarly, the devices of system 100 can transmit requests to the interface requesting for information. For example, the sensors 106, the autonomous vehicles 108, and the central server 112 can transmit a request to the interface for information related to the train 102 and railroad 104. The request can include, for example, a predicted time when the train 102 is to reach a destination, e.g., a location proximate to the dedicated road 109-1 or to an end destination, a current location of train 102, and additional status information related to train 102. The sensors 106, the autonomous vehicles 108, and the central server 112 can receive responses from the interfaces. The responses can include information pertinent to the request. For example, the sensors 106 can use the train information provided from the interface to make determinations about instructions to provide to one or more autonomous vehicles 108-1 traversing the dedicated road 109-1. This will be further described in detail below.

In some implementations, the ROW database 118 can store information related to the dedicated road 109-1. This information can include, for example, data identifying sensors that monitor the dedicated road 109-1, data identifying inactive sensors and active sensors that are positioned to monitor the dedicated road 109-1, and data identifying characteristics of the dedicated road 109-1. The data identifying the sensors monitoring the dedicated road 109-1 can include, for example, IP addresses, MAC addresses, and hostnames, as well as, the type of sensors included in each of the sensors 106. For example, sensor 106-4 can include a LIDAR system and a video camera. The data identifying inactive and active sensors can be, for example, a notification indicating sensors 106-4, 106-5, 106-7, and 106-11 through 106-17 as active. Similarly, this data can indicate that sensor 106-6 is inactive.

The data identifying characteristics of the dedicated road 109-1 can include, a number of lanes in the dedicated road 109-1, a length of the dedicated road 109-1, a direction of travel for each lane, a frequency of use for the dedicated road 109-1, a location of the marker, and data related to the toll charged amount for using the dedicated road 109-1. The data related to the toll charged amount can include, for example, a total amount of toll charged, a total amount of tolls received from the autonomous vehicles, a total amount of tolls not received from the autonomous vehicles, data identifying the transponders of the autonomous vehicles, and contact information related to the owner of the autonomous vehicles.

The central server 112 can use the information stored in the ROW database 118 to charge users that own the autonomous vehicles that drive on the dedicated road 109-1 and do not pay upon entry. Specifically, the central server 112 can transmit a request for pay to the contact information of the owner for the charged toll amount plus a fee for not paying the toll upon entry of the dedicated road 109-1. The central server 112 can receive the payment amount from the owner in response to transmitting the request to the owner, e.g., via cash, a check, a payment application, and payment through a website, to name some examples. Similarly, the central server 112 can obtain payment information related to railroad 104 usage. The payment information can include an amount the railroad management system charges for a train 102 to use the railroad 104.

As such, the central server 112 can determine financial amounts related to tolls charged to vehicles and financial amounts related to trains traversal of railroad 104. The central server 112 can produce analytics that describe, for example, profits related to using both the dedicated road 109-1 and the railroad 104, profits related to the individual usage of the dedicated road 109-1 and the railroad 104, and profit margins related to the usage of the dedicated road 109-1 and the railroad 104. Other examples are also possible.

Figure 1B:
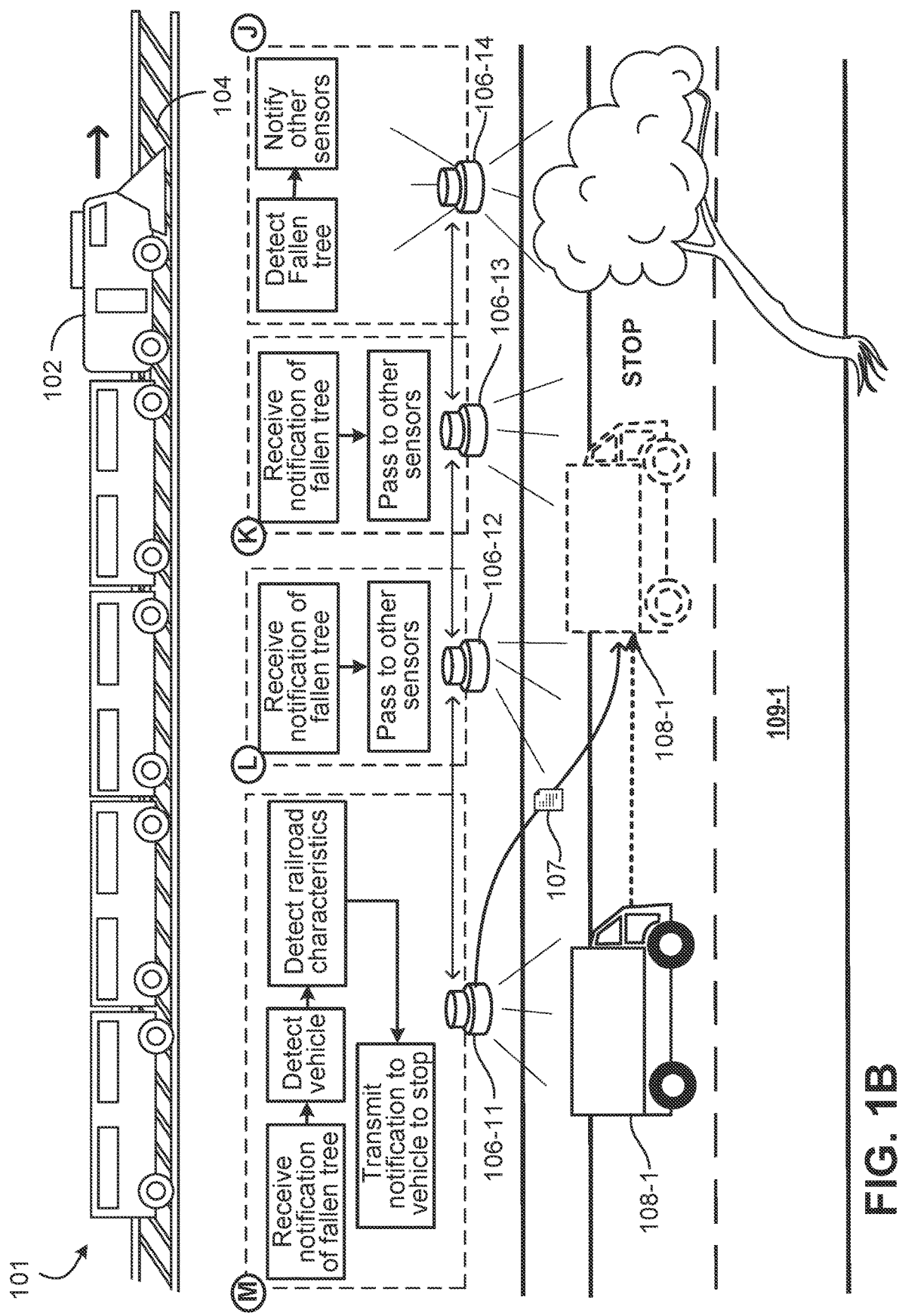
FIG. 1B is a block diagram that illustrates an example of a system for detecting events on a dedicated roadway that runs along railroad rights of way and notifying autonomous vehicles traversing the dedicated roadway of the detected events.

FIG. 1B is a block diagram that illustrates an example of a system 101 for detecting events on a dedicated roadway that runs along railroad rights of way and notifying autonomous vehicles traversing the dedicated roadway of the detected events. The system 101 is a continuation of system 100. Thus, the functions described with respect to system 101 can also be performed in system 100. Specifically, the system 101 illustrates the autonomous vehicle 108-1 traversing the dedicated road 109-1, which runs in parallel to the railroad 104. Moreover, the system 101 illustrates sensors 106-11 through 106-14 that monitor the vehicles' traversal along the dedicated road 109-1. The monitoring can include, for example, detecting events on the dedicated road 109-1, notifying vehicles traversing the dedicated road 109-1 of the detected events, and providing instructions to the vehicles of actions to take based on the detected events. FIG. 1B illustrates various operations in stages (J) through (M), which can be performed in the sequence indicated, in another sequence, with additional stages, or fewer stages. The stages (J) through (M) follow the stages of (A) through (I) of FIG. 1A.

During stage (J), the sensors 106-11 through 106-14 can monitor the dedicated road 109-1. In some implementations, the sensors 106-11 through 106-14 can monitor the dedicated road 109-1 and the railroad 104. The sensors 106-11 through 106-14 may include omni-directional capabilities. Similarly, the railroad 104 and the dedicated road 109-1 may overlap with one another. Specifically, the sensors 106-11 through 106-14 can generate sensor data on a frame-by-frame basis. The sensor data can include image data, video data, LIDAR data, radar data, and data recorded from other sensor types, to name a few examples.

The sensors can process the sensor data to identify events detected in the sensor data. In some examples, a sensor may detect in a frame of LIDAR data an animal crossing the dedicated road 109-1. In some examples, a sensor may detect in a frame of video data a 4×4 autonomous truck traversing the dedicated road 109-1. In some examples, a sensor may detect in a frame of video data ice on the dedicated road 109-1. Other examples are also possible.

As illustrated in system 101, sensor 106-14 can obtain sensor data. The sensor data can be obtained from sensor 106-14's field of view that monitors both the railroad 104 and the dedicated road 109-1. The sensor data can illustrate, for example, a tree fallen across the dedicated road 109-1. In response to detecting the event on the dedicated road 109-1, the sensor 106-14 can notify other sensors that monitor the dedicated road 109-1. Specifically, the sensor 106-14 can transmit a notification to the other sensors that includes, for example, data indicating the detected event, the generated sensor data, the generated identity product, a timestamp associated with the sensor 106-14's detection of the event, and data indicating a significance level of event.

The significance level of event can be determined based on how impactful a detected event is to the autonomous vehicles 108 traversing the dedicated road 109-1 or the train 102 traversing the railroad 104. In some examples, if the event is determined to block the flow of traffic on the dedicated road 109-1 or block the railroad 104, e.g., a tree falling on the dedicated road 109-1 or the railroad 104, then the sensor 106-14 can determine a high significance of the event. In some examples, if the event is determined to not block the flow of traffic on the dedicated road 109-1 or on the railroad 104 or block the flow of traffic only momentary, then the sensor 106-14 can determine a low significance of the event. In some examples, the significance level of the event can be based on a potential amount of money lost during a timeframe of the detected event. In this example, the sensor 106-14 can determine the significance level of the detected event is high because the tree blocking the dedicated road 109-1 ceases the flow of traffic, which, ceases the flow of tolls being charged, and ultimately reduces the amount of profit for the system 101. Other examples are also possible.

During stage (K), the sensor 106-13 can receive the notification from the sensor 106-14 over the network 110. In response to receiving the notification, the sensor 106-13 can process the notification and determine that the transmitting sensor, e.g., sensor 106-14, identified an event and determined the significance level of the event. For example, the sensor 106-13 can determine from the notification an identification of a fallen tree in the dedicated road 109-1 and the significance level of the event to be high. The sensor 106-13 can generate sensor data from its field of view to determine whether it also detects the fallen tree or another object from the sensor data. If the sensor 106-13 does not detect the fallen tree or another object, then the sensor 106-13 can transmit (i) the notification received from sensor 106-14 and (ii) a notification that includes, for example data indicating no event was detected, the generated sensor data, the generated identity product, a timestamp associated with the sensor 106-13's generated sensor data, and data indicating no significance. By transmitting the data received from the previous sensor(s) and data generated by the current sensor, the next sensor can determine a location of the detected event, e.g., in a field of view of sensor 106-14 and not in a field of view of sensor 106-13.

During stage (L), the sensor 106-12 can receive the notification from the sensor 106-13 over the network 110. Stage (L) is similar to stage (K). Sensor 106-12 can determine from the notification that sensor 106-14 has detected an event and sensor 106-13 does not detect the event. Sensor 106-12 can generate sensor data and determine that it does not detect the fallen tree or another object in its sensor data. In response, sensor 106-12 can transmit the data received from the previous sensor(s) and the data generated by sensor 106-12 to sensor 106-11.

During stage (M), the sensor 106-11 can receive the notification from the sensor 106-12 over the network 110. Stage (M) is similar to stages (K) and (L). Similar to previous sensors, the sensor 106-11 can determine from the notification that sensor 106-14 has detected an event and sensor 106-13 and 106-12 do not detect the event. In response, the sensor 106-11 can generate sensor data and determine that it does not detect a similar event of a fallen tree on the dedicated road 109-1. However, sensor 106-11 can determine from its sensor data a detected a moving vehicle, e.g., autonomous vehicle 108-1, on the dedicated road 109-1 and calculate an identity product of the detected vehicle in response. The sensor 106-11 can also detect railroad characteristics from the sensor data. The railroad characteristics can include, for example, a detection of an object on the railroad 104, a detection of train 102 traveling on the railroad 104, and other railroad detection information.

Based on the detection of the autonomous vehicle 108-1 traversing the dedicated road 109-1, the sensor 106-11 can determine an environment of the system 101. For example, the sensor 106-11 can determine from the notification received from the sensor 106-12 that another sensor ahead, e.g., sensor 106-14, has detected an event, e.g., a fallen tree. In some examples, the sensor 106-11 can determine from the notification received from the sensor 106-12 of other detected events such as, an object on a particular lane of the dedicated road 109-1, a train 102 that has fallen onto the dedicated road 109-1, an icy portion of the dedicated road 109-1, a traffic jam on the dedicated road 109-1, a vehicular accident on the dedicated road 109-1, or another type of event. The notification can indicate a location of the detected event based on the sensor that detected the event and other information.

The sensor 106-11 can determine a distance of the detected event from a location of the detected vehicle in its field of view. Specifically, the sensor 106-11 can determine a location of the sensor that detected the event based on a longitudinal order of the sensors along the dedicated road 109-1 and distance between each of the sensors. In response, the sensor 106-11 can calculate a distance that the detected autonomous vehicle 108-1 is from the detected event. For example, if the sensor 106-11 determines that a spacing between each of the sensors is 10 feet and the sensor 106-14 that detected the event is three sensors down from its current location, then the sensor 106-11 can determine that the detected autonomous vehicle 108-1 is approximately thirty feet from the detected event. The sensor 106-11 can also determine the speed of the autonomous vehicle 108-1. Based on the current speed of the autonomous vehicle 108-1 and the distance of the autonomous vehicle 108-1 to the detected event, the sensor 106-11 can determine specific actions for the vehicle to take to avoid the detected event.

For example, the actions can include accelerating, changing lanes, stopping, decelerating, turning left, turning right, making a U-turn, and other actions. In this particular example, the autonomous vehicle 108-1 can be traveling at 10 miles per hour (MPH) and the sensor 106-11 can determine that the autonomous vehicle 108-1 is sufficiently able to stop before reaching the detected event that is thirty feet ahead. In response, the sensor 106-11 can transmit a notification 107 to the autonomous vehicle 108-1 to stop moving over the network 110. The sensor 106-11 can transmit another notification to the autonomous vehicle 108-1 to continue moving when the sensors monitoring the dedicated road 109-1 and the railroad 104 no longer detect the event of the fallen tree. An absence of the fallen tree may indicate that workers removed the fallen tree from the dedicated lane. In some examples, the autonomous vehicle 108-1 can be traveling at 70 MPH and the sensor 106-11 can determine that the autonomous vehicle 108-1 does not have sufficient stopping distance before reaching the detected event that is thirty feet ahead. In response, the sensor 106-11 can transmit a notification to the autonomous vehicle 108-1 to pull off to the side of the dedicated road 109-1 to avoid the fallen tree and have ample space to decelerate. Once the sensors no longer detect the previously detected event, e.g., the fallen tree is no longer in the dedicated road 109-1, then the sensors can communicate with one another indicating that the event is no longer detected.

In response to the detection and communication by the other sensors that the previously detected event is no longer detectable, then the sensor 106-11 can transmit an additional notification to the autonomous vehicle 108-1. The additional notification can indicate, for example, to accelerate to a desired speed, decelerate to a desired speed, accelerate for particular period of time, or to return to previous operating speeds for traversing the dedicated road 109-1. If one or more of the sensors detect an additional event that may impeded the traffic on the dedicated road 109-1, impede a train 102 on the railroad 104, impede the train 102 on the combine roadway, e.g., railroad 104 in the center of the dedicated road 109-1, then the sensors 106 can transmit a notification to each of the other sensors. If the sensors 106 detect one or more autonomous vehicles on the dedicated road 109-1 along with the notification of a detected event, then the sensors 106 can notify the one or more autonomous vehicles accordingly.

In some implementations, the autonomous vehicles 108 traversing the dedicated road 109-1 can utilize data provided by the sensors monitoring the dedicated road 109-1 in conjunction with internally generated sensor data. Specifically, the autonomous vehicles 108 can generate sensor data using its one or more onboard sensors. The sensor data can include, for example, audio data, video data, LIDAR data, radar data, and other data types. The onboard sensor system can utilize the obtained sensor data to identify objects within a nearby environment of the autonomous vehicles 108. In some implementations, the enhanced machine-learning model can utilize the generated sensor data from within the autonomous vehicle 108 and data indicative of the vehicle characteristics in addition to the sensor data provided by the sensors monitoring the dedicated road 109-1. The enhanced machine-learning model can receive as input the generated sensor data from the autonomous vehicle 108's internal sensors, data indicative of the vehicle characteristics, e.g., using the vehicle's CANBUS system, and the sensor data provided by the sensors. In response, the enhanced machine-learning model can output a likelihood of a detected event.

In some examples, the enhanced machine-learning model may apply weights to these inputs. The enhanced machine-learning model may apply more weight to the sensor data and inputs supplied by the sensors 106-4 through 106-17 than the sensor data and inputs generated by the autonomous vehicle 108-1's internal sensors. In some examples, the enhanced machine-learning model may apply more weight to the sensor data and inputs generated by the autonomous vehicle 108-1's internal sensors than the sensor data and inputs supplied by the sensors 106-4 through 106-17. While on the dedicated road 109-1, the autonomous vehicle 108-1 can rely more heavily on the external sensors than the internal sensors. In some examples, the enhanced machine-learning model may utilize the inputs generated from the autonomous vehicle 108-1's internal sensors as confirmation of the external sensor's inputs. For example, if the external sensors provide sensor data that indicates for the autonomous vehicle 108-1 to accelerate, then the enhanced machine-learning model can analyze the sensor data from the autonomous vehicle 108-1's internal sensors to confirm that the area ahead of the autonomous vehicle 108-1 is obstacle free.

In some examples, if the external sensors provide sensor data that indicate the autonomous vehicle 108-1 is to take an action but the enhanced machine-learning model determines the sensor data generated by the autonomous vehicle 108-1's internal sensors contradicts the instructed action, then the enhanced machine-learning model can ignore the external sensors provided action. In some examples, if the enhanced machine-learning model determines that the external sensor's instruction and the internal sensors sensor data conflicts, then the onboard sensor system of the autonomous vehicle can generate and provide a notification to the sensor that issued the instruction and to the central server 112 notifying of conflicted instruction. The sensor can receive the notification from the autonomous vehicle 108-1's onboard sensor system and determine a resolution for the conflict with its instruction. The resolution may include, for example, notifying other sensors of the conflicted instruction, notifying the central server 112 of the conflicted instruction, and determining whether other sensors can detect the same event as the sensor that instructed the autonomous vehicle 108-1 to take an action based on the detected event. In some examples, the sensor can transmit a notification to the other sensors to disregard or delete the previous instruction. Similarly, the central server 112 can analyze the notification and determine how to improve the sensors' capabilities.

In response to the enhanced machine-learning model receiving input sensor data, the enhanced machine-learning model can generate an output of a likelihood of a detected event. The onboard sensor system can provide the likelihood of the detected event to the route guidance system of the autonomous vehicle 108-1. The route guidance system can receive the likelihood of the detected event and can produce actions for the vehicle to take while traversing the path on the dedicated lane. This is similar to stage (D) from FIG. 1A.

In some implementations, a sensor can notify the railroad system and the central server 112 in response to detecting an event on the dedicated road 109-1 or the railroad 104. Specifically, the sensor can notify the railroad system and central server 112 so these systems are prepared for the financial loss caused by the event's disruption. For example, in response to determining a tree has fallen on the dedicated road 109-1, the sensor 106-14 can transmit a notification to the interface of the railroad system and the central server 112 to warn of disruption. When the dedicated road 109-1 is blocked by a particular event, the sensors 106 can instruct the autonomous vehicles 108 to not enter the dedicated road 109-1. Preventing autonomous vehicles 108 from entering the dedicated road 109-1 ceases profit generation for the dedicated road 109-1 because the tolls are collected from these vehicles. Similarly, when the railroad 104 is blocked by a particular event, the railroad system can cease the trains from running on the railroad 104. This action also ceases profit generation for the railroad system because the railroad 104 is not being utilized.

However, the system 101 can offset the profits lost when one system is blocked from being used. For example, if the dedicated road 109-1 is blocked by an event for an extended period of time, then the railroad system can increase the number of trains the run on the railroad 104 during that time to help offset the lost profits due to the lack of tolls being collected. Similarly, if the railroad 104 is blocked by an event for an extended period of time, then the central server 112 can instruct the dedicated road 109-1 to increase the toll costs to help offset the lost profits from the railroad system not being utilized. Other examples are also possible.

Figure 1C:
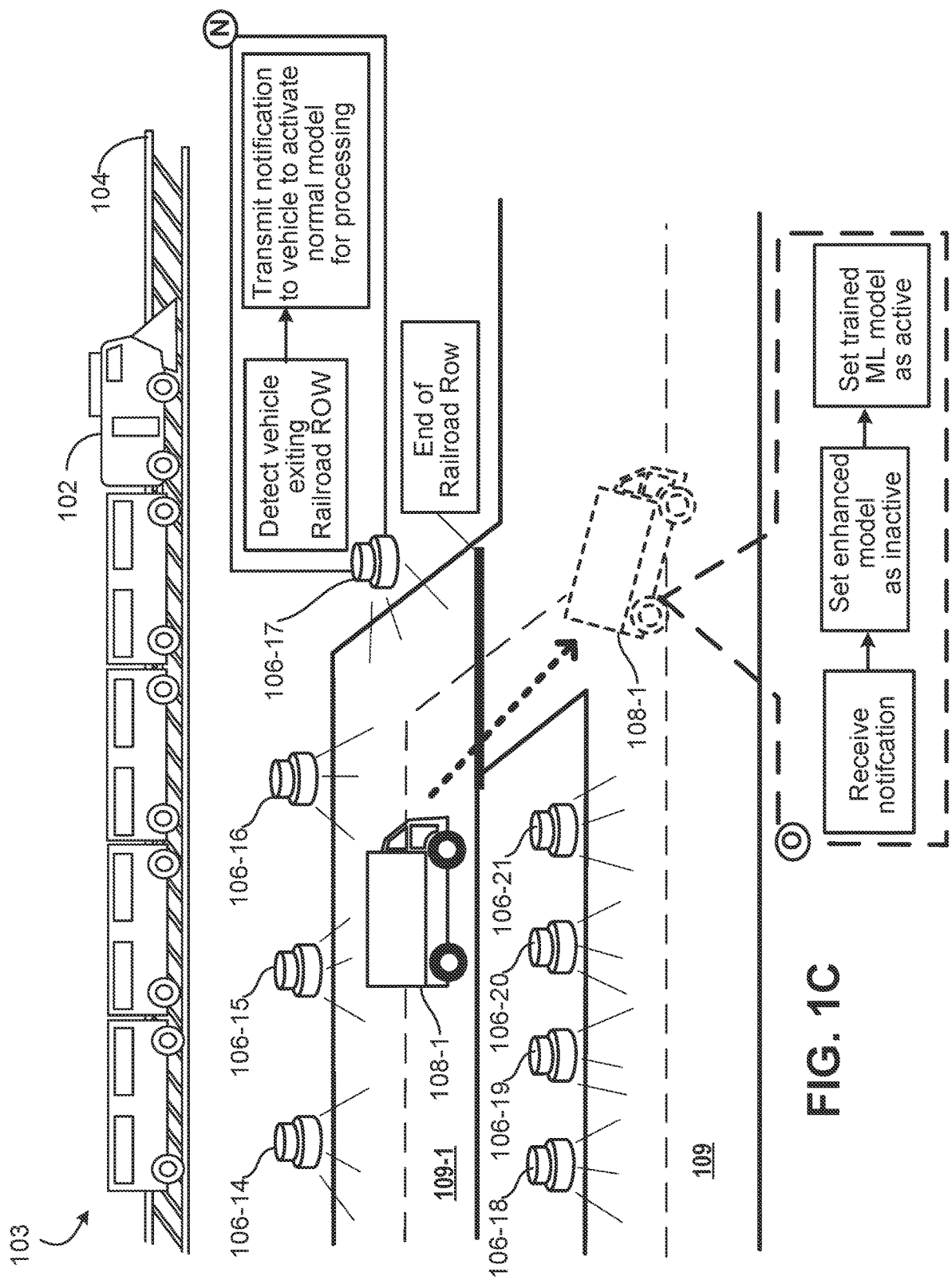
FIG. 1C is another block diagram that illustrates an example of a system for monitoring autonomous vehicles traversing a dedicated roadway that runs along railroad rights of way.

FIG. 1C is another block diagram that illustrates an example of a system 103 for monitoring autonomous vehicles traversing a dedicated roadway that runs along railroad rights of way. The system 103 is a continuation of systems 100 and 101. Thus, the functions described with respect to system 103 can also be performed in systems 100 and 101. Specifically, the system 103 illustrates the autonomous vehicle 108-1 traversing the dedicated road 109-1 and ultimately, exiting the dedicated road 109-1, which runs in parallel to the railroad 104. Moreover, the system 103 illustrates sensors 106-14 through 106-17 that monitor the vehicles' traversal along the dedicated road 109-1. Similarly, the system 103 illustrates sensors 106-18 through 106-21 which monitor the roadway 109. FIG. 1C illustrates various operations in stages (N) through (O), which can be performed in the sequence indicated, in another sequence, with additional stages, or fewer stages. The stages (N) through (O) follow the stages of (J) through (M) of FIG. 1B.

During stage (N), the sensors 106-14 through sensors 106-17 can monitor the dedicated road 109-1. In some implementations, the sensors 106-14 through 106-17 can monitor the dedicated road 109-1 and the railroad 104. Stage (N) is similar to stage (J). During stage (N), at least one of the sensors 106-14 through 106-17 can detect that the autonomous vehicle 108-1 is approaching the end of the dedicated road 109-1.

In some implementations, in response to detecting that the autonomous vehicle 108-1 satisfies a threshold distance from the end of the dedicated road 109-1, a sensor can transmit a notification to the autonomous vehicle 108-1 to switch to normal model processing mode. In some implementations, a sensor can transmit a notification to the autonomous vehicle 108-1 to switch to the normal processing mode in response to detecting the autonomous vehicle 108-1 crossing a marker that signifies an end of the dedicated road 109-1. The marker that signifies the end of the dedicated road 109-1 can be a similar marker that signified the beginning of the dedicated road 109-1.

In some examples, a designer of systems 100, 101, and 103 may designate a threshold distance of 30 feet. The sensors 106-16 and 106-17 may be designated by the designer as the sensors to monitor the autonomous vehicles exiting the dedicated road 109-1. The sensors 106-16 and 106-17 can monitor a distance the autonomous vehicle 108-1 is located from the end of the designated road 109-1 by generate sensor data and determining from the sensor data, a current distance between the location of the autonomous vehicle 108-1 and the end of the designated road 109-1. The distance can include, for example, a straight-line distance and a distance along the dedicated road 109-1 until the marker is met. The sensors 106-16 and 106-17 can generate sensor data on a frame-by-frame basis to ensure an accuracy in determining when the threshold distance is met between the location of the autonomous vehicle 108-1 and the end of the dedicated road 109-1. The sensors 106-16 and 106-17 can indicate the autonomous vehicle 108-1 satisfies the threshold distance when the autonomous vehicle meets or is within the threshold distance.

In some examples, the sensors 106-16 and 106-17 can monitor when the autonomous vehicle 108-1 crosses the marker signifying the end of the dedicated road 109-1. The autonomous vehicle 108-1 can be determined to cross the marker when its front tires cross the marker. Alternatively, the autonomous vehicle 108-1 can be determined to cross the marker when the entirety of the vehicle has moved past the marker.

In some implementations, the sensors 106-6 and 106-17 can generate a notification to transmit to the autonomous vehicle 108-1 when exiting the dedicated road 109-1. The notification can include an instruction to switch from using the enhanced machine-learning model to the one or more trained machine-learning models. In response to generating the instruction, at least one of the sensors, e.g., sensors 106-17, can transmit the generated notification to the onboard sensor processing system of the autonomous vehicle 108-1 over the network 110.

During stage (O), the onboard sensor processing system of the autonomous vehicle 108-1 can receive the generated notification. In response to receiving the generated notification, the onboard sensor system of the autonomous vehicle 108-1 can switch the enhanced machine-learning model to the normal processing mode. In some implementations, the onboard sensor system of the autonomous vehicle 108-1 can switch the enhanced machine-learning model to the normal processing mode in response to detecting its exit of the dedicated road 109-1 using one or more of its sensors. For example, in response to detecting the exit of the dedicated road 109-1, the onboard sensor system of the autonomous vehicle 108-1 can perform at least one of: (i) deactivating the ability for the one or more trained machine-learning models to receive additional inputs related to the sensor data from sensors monitoring the dedicated road 109-1, (ii) deleting the enhanced machine-learning model from memory to access the one or more trained machine-learning models, (iii) removing the enhanced machine-learning model from cache memory and storing the enhanced machine-learning model in main memory, and (iv) transmitting the enhanced machine-learning model to the central server 112 for later retrieval and removing the enhanced machine-learning model from memory, to name some examples.

In response to switching the enhanced machine-learning model to the normal processing mode, the onboard sensor system of the autonomous vehicle 108-1 can activate the one or more trained machine-learning models for further processing. In some examples, the onboard sensor system can insert the one or more trained machine-learning models in cache memory to enable accessing the one or more trained machine-learning models on a more frequency and rapid basis. In some examples, the onboard sensor system can request the one or more trained machine-learning models from the central server 112. In this example, the onboard sensor system can transmit a request to the central server 112 over network 110 for the one or more trained machine-learning models and subsequently receive the one or more trained machine-learning models in response from the central server 112.

In some implementations, the autonomous vehicle 108-1 can continue to traverse the roadway 109 after exiting the dedicated road 109-1. The autonomous vehicle 108-1 can traverse the roadway 109 using the sensor data and the one or more trained machine-learning models, as described with respect to stages (A) through (E) of FIG. 1A. The autonomous vehicle 108-1 can continue traversing the roadway 109 using its route guidance system.

Figure 2:
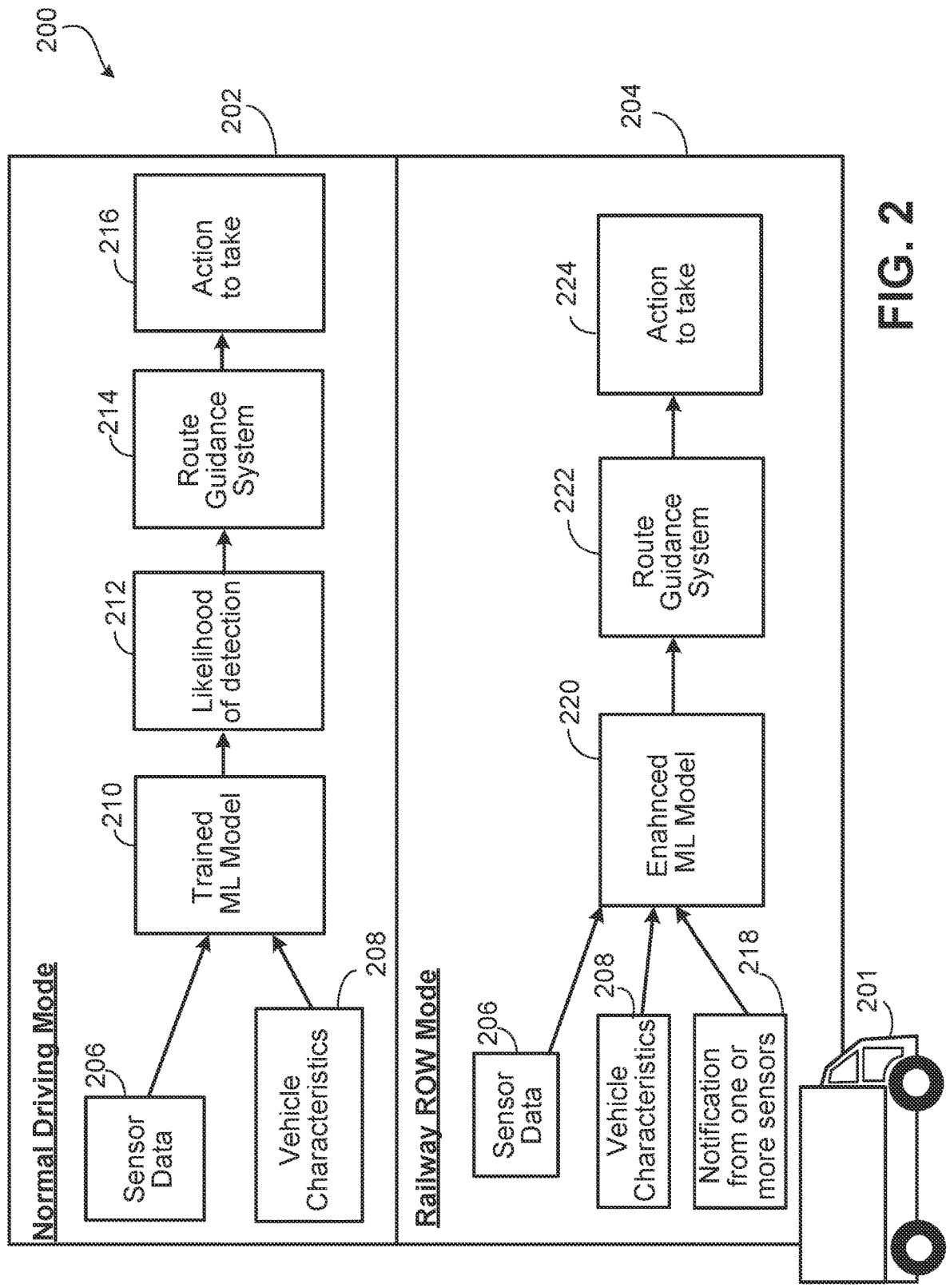
FIG. 2 is a block diagram that illustrates an example of components of an autonomous vehicle using a normal operating mode and an enhanced operating mode.

FIG. 2 is a block diagram that illustrates an example of components 200 of an autonomous vehicle using a normal operating mode and an enhanced operating mode. Specifically, the components 200 of autonomous vehicle 201 illustrates various operations related to a normal driving mode 202 and railway ROW mode 204, e.g., the enhanced operation mode. In some implementations, the normal driving mode 202 can be activated when the autonomous vehicle 201 traverses a main roadway. For example, the autonomous vehicle 201 operates in the normal driving mode 202 when traversing the main roadway 109. In some implementations, the railway ROW mode 204 can be activated when the autonomous vehicles traverses a dedicated road that runs in parallel to a railroad. For example, the autonomous vehicle 201 operates in railway ROW mode 204 when traversing the dedicated road 109-1 that runs in parallel to the railroad 104.

For example, in the normal driving mode 202, the onboard sensor system of autonomous vehicle 201 can obtain sensor data 206. The sensor data 206 can include sensor data generated by one or more sensors onboard the autonomous vehicle 201. The sensor data can include for example, video data, audio data, LIDAR data, radar data, and other data types. The sensor data 206 can illustrate an environment proximate to the autonomous vehicle 201 as seen by its sensors. The environment can include, for example, a portion of the roadway proximate to the autonomous vehicle 201, traffic signs, traffic lights, various types of lanes, objects in the roadway, weather, railroad, and other information. The sensors can obtain sensor data in a continuous or periodic fashion. This is similar to stage (A) from FIG. 1A.

The onboard sensor system of the autonomous vehicle 201 can obtain vehicle characteristics 208. For example, the onboard sensor system can communicate with various device of the autonomous vehicle 201 utilizing the CAN-BUS system to obtain the vehicle characteristic information. The vehicle characteristic information can include, for example, ABS, cruise control, electric power steering, vehicle dynamics, and battery and recharging systems, to name a few examples. This is similar to stage (A) from FIG. 1A.

In response to obtaining the sensor data 206 and the vehicle characteristics 208, the onboard sensor system can provide the sensor data 206 and the vehicle characteristics 208 as input to the one or more trained machine-learning models 210. The one or more trained machine-learning models 210 can process the received inputs through each of the nodes in the models. The one or more trained machine-learning models 210 can receive inputs and generate outputs on a continuous basis or each time new input data is obtained by the sensors. In some examples, the one or more trained machine-learning models 210 can include a recurrent neural network (RNN) model. In some examples, the central server 112 can train the one or more RNN machine-learning models using the data stored in the vehicle database 114, the railroad database 116, ROW database 118, and other databases that store images utilized for object detection. In some examples, the central server 112 can iteratively train the one or more RNN machine-learning models based on feedback from the sensors monitoring the roadway and sensors onboard the autonomous vehicles. This is similar to stage (B) from FIG. 1A.

In response to providing the sensor data 206 and the vehicle characteristics 208 as inputs to the trained machine-learning models, the one or more trained machine-learning models 210 can output a likelihood detection of an event 212. For example, the one or more trained machine-learning models 210 can output a detection of 2% of a detected object in the proximity of the autonomous vehicle 201. Similarly, the one or more trained machine-learning models 210 can be configured to output a classification of one or more objects identified in the sensor data 206 and other detected events in the sensor data 206. This is similar to stage (C) from FIG. 1A.

The route guidance system 214 of the autonomous vehicle 201 can receive the likelihood detection of an event 212 from the one or more trained machine-learning models. The route guidance system 214 can receive the inputs from the vehicle characteristics 208. The route guidance system 214 can include one or more algorithmic processes that can monitor a location of a vehicle in real time, e.g., via geographic coordinate system (GPS), and map the location of the vehicle on a digital map. For an autonomous vehicle, the route guidance system can ensure the autonomous vehicle 201 follows a route guidance from an origin location to a destination location. The route guidance system can produce actions 216 for the vehicle to take while traversing the roadway. The actions 216 can include, for example, accelerate, change lanes, stop, decelerate, turn left, turn right, U-turn, and other actions. This is similar to stage (D) from FIG. 1A. The route guidance system can determine one or more actions for the vehicle to take based on the likelihood of detection and the vehicle characteristics 208. For example, the route guidance system may rely on the vehicle characteristics to determine whether the corresponding vehicle is capable of taking a particular action based on a particular status of the vehicle, e.g., current speed, acceleration, temperature of the vehicle, or other.

Similarly, the route guidance system 214 can determine actions 216 for the autonomous vehicle 201 to make based on the likelihood detection of event 212. For example, the route guidance system 214 can ensure the autonomous vehicle 201 avoids a detected object while traversing to the destination. In this example, the route guidance system 214 can instruct the autonomous vehicle 201 to move in the left lane in response to analyzing the likelihood detection of event 212 from the one or more trained machine-learning models 210. This is similar to stage (E) from FIG. 1A.

In some implementations, the autonomous vehicle 201 can operate in the railway ROW mode 204, e.g., enhanced mode, when the autonomous vehicle 201 is instructed to switch to using the enhanced machine-learning model. Specifically, the autonomous vehicle 201 can switch to using the enhanced machine-learning model when traversing the dedicated lane that runs in parallel to the roadway. One or more sensors monitoring the dedicated lane can detect the autonomous vehicle 201's entry to the dedicated lane and in response, transmit a notification to the onboard sensor system of the autonomous vehicle 201 to switch to using the enhanced machine-learning model.

As the autonomous vehicle 201 traverses the dedicated lane using the enhanced machine-learning model, e.g., under the railroad ROW mode 204, the onboard sensor system of the autonomous vehicle 201 can receive a notification from one or more sensors. Specifically, the onboard sensor system of the autonomous vehicle 201 can receive a notification or sensor data from the sensors monitoring the dedicated lane and provide the received sensor data to the enhanced machine-learning model 220 model to produce an output. The notification can include sensor data, e.g., video data, LIDAR data, or radar data, or an instruction that indicates an action for the autonomous vehicle 201 to take. More specifically, the action can indicate more detailed characteristics, such as, accelerate for 10 second, accelerate until a target speed is met, or decelerate until a target speed is met, to name a few examples.

In response to receiving the instruction from one or more of the sensors monitoring the dedicated lane, the onboard sensor system can provide the received notification as input to the enhanced machine-learning model 220. The onboard sensor system can generate sensor data using sensors internal to the autonomous vehicle 201 and provide the internally generated sensor data as input to the enhanced machine-learning model 220. The onboard sensor system can provide the internally generated sensor as input to the enhanced machine-learning model 220 to enhance the accuracy of the enhanced machine-learning model 220. For example, the enhanced machine-learning model 220 can rely on sensor data from sensors onboard the autonomous vehicle and sensor data from sensors monitoring the dedicated road. In response, the enhanced machine-learning model 220 can produce a likelihood of a detected event. The likelihood of a detected event may include, for example, a percentage or statistical likelihood of a detected event or an action for the autonomous vehicle 201 to take. The reliance on sensor data from both external and internal sensors is beneficial for at least two reasons.

First, the enhanced machine-learning model 220 can benefit from sensor data that describes an entirety of the dedicated road. The sensor data now includes not just observations gleaned within proximity of the autonomous vehicle but also observations gleaned from the entirety of the roadway. In this manner, the enhanced machine-learning model 220 can produce improved likelihoods or decisions for the autonomous vehicle using more informed sensor data. For example, sensor data from the sensors monitoring the roadway can describe an event of an accident 1 mile from the location of the autonomous vehicle. The autonomous vehicle's internal sensor data may indicate that no obstacles exist within close proximity to the autonomous vehicle, and as such, the enhanced machine-learning model will produce a likelihood of no obstacles on the roadway using the internal sensor data alone. As a result, the route guidance system of the autonomous vehicle will instruct the autonomous vehicle to continue on the same road. However, with the added benefit of sensor data that describes the entirety of the dedicated road, the enhanced machine-learning model can now produce an indication that the autonomous vehicle should navigate a different path because of the obstacle detected one mile ahead. As such, the added sensor data from the external sensor data improves the enhanced machine-learning model's decision capabilities and ultimately, enables the autonomous vehicle to glean observations from the entirety of the dedicated road.

Second, the sensors monitoring the dedicated road can ensure autonomous vehicles traveling the dedicated road make efficient use of the dedicated road. These sensors can identify events and other activities that onboard sensors of the autonomous vehicles cannot identify based on their viewing distance and/or limited range. As such, the sensors can ensure these autonomous vehicles travel an optimum path to their destination by informing of events, activities, or obstacles that may otherwise disrupt their intended path of travel. By doing so, the flow of traffic on the dedicated road can be managed in an orderly and controlled manner.

The onboard sensor system of the autonomous vehicle 201 can then provide the output of the enhanced machine-learning model 220 as input to the route guidance system 222. The route guidance system 222 can determine actions 224 for the autonomous vehicle 201 to make in light of the output produced by the enhanced machine-learning model 220. Route guidance system 222 and action to take 224 is similar to route guidance system 214 and the action to take 216.

Figure 3:
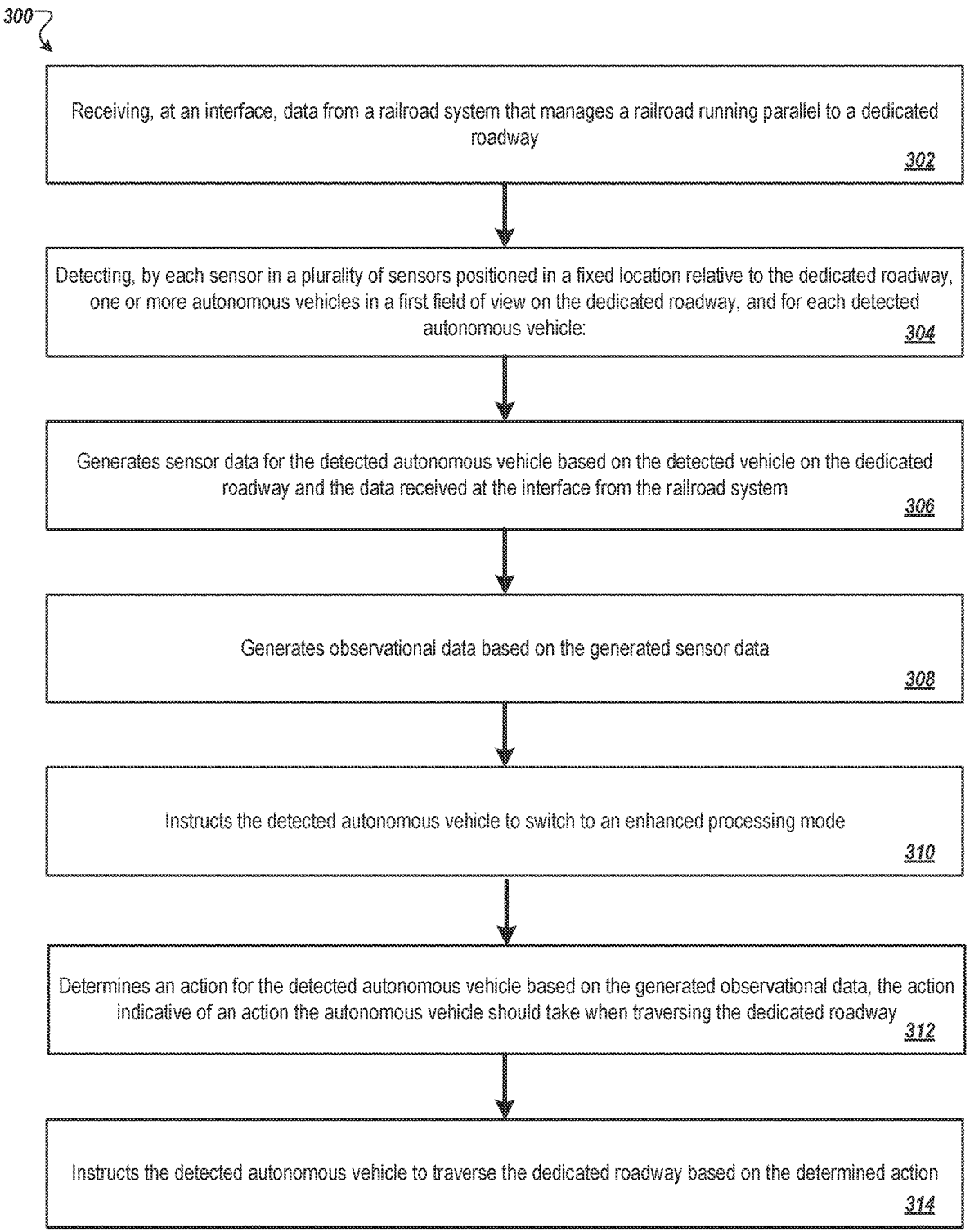
FIG. 3 is a flow diagram that illustrates an example of a process for monitoring autonomous vehicles traversing a dedicated roadway that runs along railroad rights of way.

FIG. 3 is a flow diagram that illustrates an example of a process 300 for monitoring autonomous vehicles traversing a dedicated roadway that runs along railroad rights of way. The sensors, such as sensors 106, and a central server, may perform the process 300.

The central server may receive data from a railroad system that manages a railroad running parallel to a dedicated roadway (302). Specifically, the central server can receive from an interface data from a railroad system that manages a railroad running parallel to the dedicated roadway. The data identifying the railroad system can include data that identifies the interface, which may be provided by a client device, computing device, or other. The data from the railroad system can include, for example, past schedules of train trips, a number of cars connected on a train, a time for an upcoming trip of train, any mechanical issues or failures related to train, contact information for a train operator, or dynamic characteristics related to the train, e.g., train speed, acceleration, and direction of travel, to name a few examples. Similarly, the sensors and the central server can transmit requests to the interface for querying information from the railroad system. This information can helpful in assisting the sensors and the central server for determining actions for vehicles traversing the dedicated roadway to take while traversing the dedicated roadway.

Each sensor from a plurality of sensors is positioned in a fixed location relative to the dedicated roadway, and each sensor can communicate with a central server. Moreover, each sensor can detect one or more autonomous vehicles in a first field of view on the dedicated roadway (304). For example, the plurality of sensors can be positioned longitudinal to the direction of traffic on the roadway. Each sensor can be placed in the ground at a predetermined distance apart from one another. Additionally, each sensor's field of view can be positioned towards a segment or area of the roadway to detect and monitor vehicles. Similarly, each sensor's field of view can be positioned to monitor characteristics of a railroad that runs in parallel to the dedicated roadway. For each detected vehicle, the sensors can perform the operations as described below. A sensor can detect a particular vehicle in its field of view. The sensor can use object detection or some form of classification to detect an object in its field of view.

Each sensor can generate sensor data for the detected autonomous vehicle based on the detected vehicle on the dedicated roadway and the data received at the interface from the railroad system (306). The sensor data can correspond to an identification of a vehicle type, characteristics of detected vehicle or vehicles, vehicular density per unit area, vehicle congestion, vehicle headway, and vehicle dynamics, to name some examples. The identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular density per unit area can correspond to a number of vehicles measured over a particular area in traffic. Vehicular congestion can correspond to a measure of an amount of traffic and movement rate of the traffic in a particular area. Vehicle headway can correspond to a distance between a first and second vehicle in a transit system measured in time or in distance. Vehicle dynamics can include acceleration, deceleration, and velocity of one or more vehicles traveling along the prior roadways over a period of time.

Each sensor can identify features of the vehicles it detects and can use the feature data to generate the sensor data. For example, each sensor can identify features of the detected vehicles that include, for example, the vehicle color, e.g., as represented by red-green-blue (RGB) characteristics, the vehicle size, e.g., as calculated through optical characteristics, the vehicle class, e.g., as calculated through optical characteristics, and the volume of the vehicle, as calculated through optical characteristics. In one such example, a sensor can determine that a detected vehicle is the color blue, is over 100 ft$^3$ in volume, has a vehicle type of a sedan, and is a medium sized vehicle. Other examples are also possible. The sensor can also determine one or more characteristics of the vehicle, such as its rate of speed, the distance away from the sensor, the vehicle's direction of travel, and a number of individuals found in the vehicle, to name a few examples. Based on the generated feature data, the sensor can generate sensor data that includes an identification of a vehicle type, characteristics of detected vehicle or vehicles, vehicular density per unit area, vehicle congestion, vehicle headway, and vehicle dynamics, to name a few examples.

In some implementations, a sensor can query a railroad system for railroad specific information. This information can include, for example, characteristics of a train currently traversing the roadway, characteristics of previous trains that have traversed the roadway, and characteristics of the railroad, to name some examples. Each sensor can also query for train and railroad information from the interface that communicates with the railroad system. In some implementations, the central server can query for train and railroad information from the interface that communicates with the railroad system.

In some implementations, each sensor can monitor train activities on the railroad. These sensors may include, for example, omni-directional capability that enables viewing and obtaining sensor data from each direction simultaneously, in a 360-degree fashion. In this manner, the sensor can not only monitor autonomous vehicles entering, traversing, and exiting the dedicated roadway, but also, monitoring on or more trains traversing the railroad. The sensors can monitor the sensor data of the railroad to aid the sensors in determining actions for the autonomous vehicles to take while traversing the dedicated roadway.

Each sensor can generate observational data based on the generated sensor data (308). For example, when a sensor generates sensor data of the feature data, the sensor can generate an identity product of the feature data and can transmit data representing the identity product of the feature data when the corresponding detected vehicle has exited the sensor's field of view. The data representing the identity product of the feature data can include, for example, a data structure, a matrix, or a link to data stored in a database. Each sensor can communicate or transmit the sensor data and observational data to other various sensors. For example, a sensor that generated sensor data can transmit the generated sensor data and observational data to the next sensor in the direction of traffic.

The next sensor can receive the data representing the identity product of the feature data and can compare the data representing the identity product of the feature data to new feature data generated by the next sensor. The next sensor performs this comparison to determine whether it is seeing the same vehicle as seen by the previous sensor, e.g., the sensor that transmitted the data representing the identity product of the feature data to the next sensor.

The sensors can also generate observational data that also describe events occurring on the dedicated roadway. The observational data can include, for example, a fallen tree, an obstacle on the dedicated roadway, an icy portion of the dedicated roadway, a traffic jam, a vehicular accident, a train that has fallen on the dedicated roadway, or another type of event. The observational data can also indicate a location of the detected event on the dedicated roadway based on the generated sensor data. The observational data can be shared between sensors and shared between sensors and the central server.

Each sensor can instruct the detected autonomous vehicle to switch to an enhanced processing mode (310). In some implementations, the autonomous vehicles that traverse a roadway can receive instructions from sensors proximate to and monitoring the dedicated roadway to enhance its thinking. Specifically, the autonomous vehicles can receive instructions from these sensors to switch to using an enhanced processing mode. The enhanced processing mode is a mode used by the autonomous truck to not only rely on sensor data generated by sensors onboard the autonomous vehicle but also rely on sensor data or instructions provided by the sensors proximate to the dedicated roadway. These sensors can offer insights describing events and detection of actors on the dedicated roadway that may be unseen by the onboard sensors of the autonomous vehicles. When switching to the enhanced processing the mode, the autonomous vehicle can activate an enhanced machine-learning algorithm that uses both sensor data from onboard sensors and sensor data from external sensors monitoring the dedicated roadway.

In some implementations, the sensors can monitor an autonomous vehicle's entry into the dedicated road using sensor data. The sensor data can illustrate an autonomous vehicle traversing toward the dedicated road and upon detecting the autonomous vehicle crossing over a marker, being within a threshold distance from an entrance of the dedicated road, or entering the dedicated roadway, to name a few examples, one or more sensors can transmit a notification to the autonomous vehicle to switch to using the enhanced processing mode. The sensors can transmit a notification to the onboard sensor system of the autonomous vehicle to switch from using a normal processing mode to using the enhanced processing mode in response to detecting the autonomous vehicle's entry. For example, the sensors may utilize the identity product of the autonomous vehicle as a means to detect the vehicle's entry into the dedicated lane. The enhanced processing mode is a setting in which the autonomous vehicle provides sensor data from the sensors monitoring the dedicated roadway and sensor data from onboard the autonomous vehicle to an enhanced trained machine-learning model. The output of the enhanced trained machine-learning model can be a likelihood of a detected event. The autonomous vehicle can use the output to determine a path for the vehicle to take while traversing the dedicated roadway.

Each sensor can determine an action for the detected autonomous vehicle based on the generated observational data, the action indicative of an action the autonomous vehicle should take when traversing the dedicated roadway (312). Specifically, each sensor may detect observations from the dedicated roadway and observations of one or more trains traversing the railroad. The sensor data may indicate, for example, a tree has fallen across the dedicated roadway, a train has derailed off the railroad and landed on the dedicated roadway, an icy patch on the dedicated roadway, a traffic jam, traffic congestion, a roadway clear of obstacles, and data indicative of other events.

The sensors may communicate this information to the central server, where the central server can determine other specific information related to vehicles traversing the roadway. For example, the central server may determine the prevailing speeds of autonomous vehicles traversing the roadway, which can aid in indicating which speeds vehicles should travel along the dedicated roadway. Similarly, the central server may determine the vehicle dynamics of vehicles currently traversing the roadway, and characteristics of one or more trains currently traversing the roadway. Using this information, the central server and/or the sensors can determine one or more actions for the one or more autonomous vehicles traversing the dedicated roadway to take. These actions can include, for example, accelerate, change lanes, stop, decelerate, turn left, turn right, U-turn, and other actions. In some implementations, the central server may transmit the one or more actions for the autonomous vehicles to take to the sensors monitoring the area proximate to the dedicated roadway.

Each sensor can instruct the autonomous vehicle to traverse the dedicated roadway based on the determined action (314). In some implementations, a sensor can transmit a notification to the autonomous vehicle to take a specific action. The specific action may be an action generated by one or more sensors monitoring the dedicated roadway or an action generated by the central server. For example, if the sensors detect that one or more autonomous vehicles are to potentially collide with a derailed train on the dedicated roadway, the sensors can transmit a notification for the autonomous vehicles to take specific actions. These actions can include, rerouting traffic on the dedicated roadway to avoid the derailed train, decelerating each of the autonomous vehicles and indicating to change lanes to avoid the derailed train, and stopping the autonomous vehicles from colliding with the derailed train, to name a few examples. The sensors can send one or multiple instructions to the autonomous vehicles for actions to take regarding avoiding the derailed train.

In some implementations, the sensors can send actions for the autonomous vehicles to take when no event or obstacle is identified on the detected roadway. These actions can include, for example, accelerating to a target speed, decelerating to a target speed, remaining in the lane of the dedicated roadway, and switching to a normal processing mode upon exiting the dedicated roadway, to name a few examples. The autonomous vehicle's enhanced trained machine-learning model and route guidance system can maneuver the autonomous vehicle based on instructions provided by the sensors monitoring the dedicated roadway and sensor data generated by the sensors onboard the autonomous vehicle.

In some implementations, the sensors monitoring the dedicated roadway can determine when the autonomous vehicle is proximate to the end of the dedicated roadway. The sensors can determine when the autonomous vehicle is within a threshold distance of the end of the dedicated roadway or has exited the dedicated roadway. The sensors can perform this function for multiple autonomous vehicles traversing the dedicated roadway. In response to detecting the one or more autonomous vehicles being proximate to the end of the dedicated roadway, the sensors can transmit a notification to the autonomous vehicles to switch to the normal processing mode. The notification can indicate to these autonomous vehicles exiting the dedicated roadway to switch from the enhanced mode to the normal processing mode.

In the normal processing mode, the autonomous vehicle uses a trained machine-learning model that processes sensor data from the onboard sensors. Moreover, the trained machine-learning model does not use sensor data or instructions as input from the sensors monitoring the dedicated roadway because the autonomous vehicle is no longer traveling the dedicated roadway. Generally, these sensors monitoring the dedicated roadway only communicate with autonomous vehicles traversing the dedicated roadway. When the autonomous vehicles exit the dedicated roadway, they no longer need to communicate with these sensors that monitor the dedicated roadway. As such, the autonomous vehicle uses the trained machine-learning model in the normal processing mode prior to the entrance of the dedicated roadway and after exiting the dedicated roadway.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, at an interface, data from a railroad system that manages a railroad running parallel to a dedicated roadway whose access is limited to autonomous vehicles;
   detecting, by each sensor in a plurality of sensors positioned in a fixed location relative to the dedicated roadway whose access is limited to autonomous vehicles, one or more of the autonomous vehicles in a first field of view on the dedicated roadway, and for each detected autonomous vehicle:
      generating sensor data for the detected autonomous vehicle based on detecting the detected autonomous vehicle on the dedicated roadway whose access is limited to autonomous vehicles and the data received at the interface from the railroad system;
      generating observational data based on the generated sensor data;
      determining an action for the detected autonomous vehicle based on the generated observational data, the action indicative of an action the autonomous vehicle to take while traversing the dedicated roadway whose access is limited to autonomous vehicles; and
      transmitting data indicative of the action to the detected autonomous vehicle while the autonomous vehicle traverses the dedicated roadway whose access is limited to autonomous vehicles.

2. The computer-implemented method of claim 1, wherein:
   the plurality of sensors:
      in response to generating the observational data based on the generated sensor data, determines, from the sensor data and the observational data, data indicating that a train traversing the railroad has derailed off the railroad and fallen across the dedicated roadway;
      determines, from the sensor data and the observational data, data indicating that at least some of the autonomous vehicles traversing the dedicated roadway are on a path to collide with the derailed train; and
      in response, transmits, to at least some of the autonomous vehicles, data indicating to stop traversing on the dedicated roadway.

3. The computer-implemented method of claim 1, wherein:
   the plurality of sensors:
      in response to generating the observational data based on the generated sensor data, determines, from the sensor data and the observational data, data indicating that a train traversing the railroad has derailed off the railroad and fallen across the dedicated roadway;
      determines, from the sensor data and the observational data, data indicating that at least some of the autonomous vehicles traversing the dedicated roadway are on a path to collide with the derailed train; and
      in response, transmits, to at least some of the autonomous vehicles, data indicating to a second roadway that runs in parallel to the dedicated roadway to avoid the derailed train.

4. A computer-implemented method comprising:
receiving, at an interface, data from a railroad system that manages a railroad running parallel to a dedicated roadway whose access is limited to autonomous vehicles;
detecting, by each sensor in a plurality of sensors positioned in a fixed location relative to the dedicated roadway whose access is limited to autonomous vehicles, one or more autonomous vehicles in a first field of view on the dedicated roadway, and for each detected autonomous vehicle:
generating sensor data for the detected autonomous vehicle based on detecting the detected autonomous vehicle on the dedicated roadway whose access is limited to autonomous vehicles and the data received at the interface from the railroad system;
generating observational data based on the generated sensor data;
determining, from the observational data, the detected autonomous vehicle is within proximity to an end of the dedicated roadway whose access is limited to autonomous vehicles; and
response to determining the detected autonomous vehicle is within proximity to the end of the dedicated roadway whose access is limited to autonomous vehicles, transmitting, to the detected autonomous vehicle, an instruction indicating the detected autonomous vehicle is to switch to a normal processing mode.

5. The computer-implemented method of claim 4, further comprising:
in response to determining the detected autonomous vehicle has crossed the end of the dedicated roadway and has entered a roadway that runs in parallel to the dedicated roadway, transmitting, to the detected autonomous vehicle, the instruction indicating the detected autonomous vehicle is to switch to the normal processing mode from an enhanced processing mode.

6. The computer-implemented method of claim 5, wherein the enhanced processing mode causes the detected autonomous vehicle to utilize (i) the sensor data from the plurality of sensors and (ii) additional sensor data from onboard sensors of the detected autonomous vehicle, for producing actions while traversing the dedicated roadway.

7. A computer-implemented method comprising:
receiving, by one or more processors of an autonomous vehicle, data indicative of route guidance for the autonomous vehicle to traverse;
obtaining, by the one or more processors, sensor data from one or more sensors onboard the autonomous vehicle as the autonomous vehicle traverses a first roadway based on the route guidance;
providing, by the one or more processors, the obtained sensor data to a trained machine-learning model, the trained machine-learning model configured to output a likelihood detection of an event that impacts a dedicated roadway whose access is limited to autonomous vehicles;
receiving, by the one or more processors and from the trained machine-learning model, the likelihood detection of the event that impacts the dedicated roadway whose access is limited to autonomous vehicles;
determining, by the one or more processors, whether the likelihood detection of the event indicates whether the autonomous vehicle will avoid the event that impacts the dedicated roadway whose access is limited to autonomous vehicles;
in response to determining that the autonomous vehicle will avoid the event that impacts the detected roadway whose access is limited to autonomous vehicles, instructing, by the one or more processors, the autonomous vehicle to continue along the route guidance by turning left from the first roadway to the dedicated roadway whose access is limited to autonomous vehicles.

8. The computer-implemented method of claim 7, further comprising:
in response to turning left from the first roadway to the dedicated roadway, receiving, by the one or more processors and from one or more sensors monitoring the dedicated roadway, data that instructs the autonomous vehicle to utilize an enhanced processing mode for producing actions while traversing the dedicated roadway.

9. The computer-implemented method of claim 7, further comprising:
in response to turning left from the first roadway to the dedicated roadway, receiving, by the one or more processors and from one or more sensors monitoring the dedicated roadway, data that instructs the autonomous vehicle to switch from a normal processing mode to an enhanced processing mode, wherein the normal processing mode is used by the autonomous vehicle for producing actions while traversing the first roadway and the enhanced processing mode is used by the autonomous vehicle for producing actions while traversing the dedicated roadway.

10. A computer-implemented method comprising:
receiving, by one or more processors of an autonomous vehicle, data indicative of route guidance for the autonomous vehicle to traverse;
obtaining, by the one or more processors, sensor data from one or more sensors onboard the autonomous vehicle as the autonomous vehicle traverses a first roadway based on the route guidance;
providing, by the one or more processors, the obtained sensor data to a trained machine-learning model, the trained machine-learning model configured to output a likelihood detection of an event that impacts the first roadway;
receiving, by the one or more processors and from the trained machine-learning model, the likelihood detection of the event that impacts the first roadway;
determining, by the one or more processors, whether the likelihood detection of the event indicates whether the autonomous vehicle will not avoid the event that impacts the first roadway;
in response to determining the autonomous vehicle will not avoid the event that impacts the first way by traversing on the route guidance, instructing, by the one or more processors, the autonomous vehicle to turn left from the first roadway to a dedicated roadway whose access is limited to autonomous vehicles to avoid the event.

11. The computer-implemented method of claim 10, further comprising:
in response to turning left from the first roadway to the dedicated roadway, receiving, by the one or more processors and from one or more sensors monitoring the dedicated roadway, data that instructs the autonomous vehicle to utilize an enhanced processing mode for producing actions while traversing the dedicated roadway.

12. The computer-implemented method of claim 10, further comprising:
in response to turning left from the first roadway to the dedicated roadway, receiving, by the one or more processors and from one or more sensors monitoring the dedicated roadway, data that instructs the autonomous vehicle to switch from a normal processing mode to an enhanced processing mode, wherein the normal processing mode is used by the autonomous vehicle for producing actions while traversing the first roadway and the enhanced processing mode is used by the autonomous vehicle for producing actions while traversing the dedicated roadway.

13. A computer-implemented method comprising:
receiving, by one or more processors of an autonomous vehicle, sensor data from one or more sensors onboard the autonomous vehicle as the autonomous vehicle traverses a dedicated roadway whose access is limited to autonomous vehicles;
receiving, by the one or more processors, additional sensor data from one or more other sensors monitoring the dedicated roadway whose access is limited to autonomous vehicles;
providing, by the one or more processors, (i) the received sensor data from the one or more sensors onboard the autonomous vehicle and (ii) the received additional sensor data from the one or more other sensors monitoring the dedicated roadway whose access is limited to autonomous vehicles, to a trained machine-learning model, the trained machine-learning model configured to output a likelihood detection of an event;
receiving, by the one or more processors and from the trained machine-learning model, the likelihood detection of the event;
determining, by the one or more processors, whether the likelihood detection of the event indicates whether the autonomous vehicle will avoid the event; and
in response to determining whether the autonomous vehicle will likely avoid the event, instructing, by the one or more processors, the autonomous vehicle to continue along the route guidance or to leave the dedicated roadway whose access is limited to autonomous vehicles.

14. The computer-implemented method of claim 13, wherein the sensor data from the one or more sensors onboard the autonomous vehicle comprises data of an environment proximate to the autonomous vehicle, and the sensor data comprises at least one of video data, audio data, LIDAR data, and radar data.

15. The computer-implemented method of claim 13, wherein the additional sensor data comprises one or more video data, LIDAR data, radar data, or an instruction that indicates an action for the autonomous vehicle to take while traversing the dedicated roadway.

16. A computer-implemented method comprising:
receiving, at an interface, data from a railroad system that manages a railroad running parallel to a dedicated roadway;
detecting, by each sensor in a plurality of sensors positioned in a fixed location relative to the dedicated roadway, one or more autonomous vehicles in a first field of view on the dedicated roadway, and for each detected autonomous vehicle:
generating sensor data for the detected autonomous vehicle based on detecting the detected autonomous vehicle on the dedicated roadway and the data received at the interface from the railroad system;
generating observational data based on the generated sensor data;
instructing the detected autonomous vehicle to switch to an enhanced processing mode;
waiting a predetermined period of time to receive a confirmation from the detected autonomous vehicle that the detected autonomous vehicle has confirmed switching to the enhanced processing mode; and
in response to receiving the confirmation from the detected autonomous vehicle prior to the predetermine time period elapsing, notifying each other sensor in the plurality of sensors that the detected autonomous vehicle has switched to the enhanced processing mode.

17. The computer-implemented method of claim 16, wherein the notification to each other sensor in the plurality of sensors that the detected autonomous vehicle has switched to the enhanced processing mode indicates to each other sensor that the detected autonomous vehicle is prepared to receive one or more instructions from each of the sensors in the plurality of sensors that monitor the dedicated roadway.

18. A computer-implemented method comprising:
receiving, at an interface, data from a railroad system that manages a railroad running parallel to a dedicated roadway;
detecting, by each sensor in a plurality of sensors positioned in a fixed location relative to the dedicated roadway, one or more autonomous vehicles in a first field of view on the dedicated roadway, and for each detected autonomous vehicle:
generating sensor data for the detected autonomous vehicle based on the detected autonomous vehicle on the dedicated roadway and the data received at the interface from the railroad system;
generating observational data based on the generated sensor data;
instructing the detected autonomous vehicle to switch to an enhanced processing mode;
waiting a predetermined period of time to receive a confirmation from the detected autonomous vehicle that the detected autonomous vehicle has confirmed switching to the enhanced processing mode;
in response to not receiving the confirmation from the detected autonomous vehicle prior to the predetermine time period elapsing, transmitting a first notification to the detected autonomous vehicle to cease driving the dedicated roadway; and
transmitting a second notification to authorities indicating the detected autonomous vehicle being an at risk vehicle.

19. A computer-implemented method comprising:
receiving, at an interface, data from a railroad system that manages a railroad running parallel to a dedicated roadway;
detecting, by each sensor in a plurality of sensors positioned in a fixed location relative to the dedicated roadway, one or more autonomous vehicles in a first field of view on the dedicated roadway;
detecting, by each of the sensors, one or more events on the first field of view on the dedicated roadway for a predetermined period of time;
in response to detecting the one or more events on the first field of view on the dedicated roadway for the predetermined period of time, determining, by each of the sensors, the one or more detected events block traffic on the dedicated roadway; and transmitting, by each of the sensors and to the interface that communicates with the railroad system, a notification that indicates the railroad system can increase a number of trains running on the railroad while the one or more detected events block traffic on the dedicated roadway to offset a cost utilization of the dedicated roadway.

20. The computer-implemented method of claim 19, wherein the interface displays data related to the railroad that traverses in parallel to the dedicated roadway and one or more trains traverse the railroad, the data comprising a number of the one or more trains, a direction of the one or more trains traveling on the railroad, and a number of railroads.

* * * * *